(12) United States Patent
Khoshnevis et al.

(10) Patent No.: US 9,185,690 B2
(45) Date of Patent: Nov. 10, 2015

(54) ALLOCATING AND DETERMINING RESOURCES FOR A DEVICE-TO-DEVICE LINK

(75) Inventors: Ahmad Khoshnevis, Portland, OR (US); Shohei Yamada, Camas, WA (US); Zhanping Yin, Vancouver, WA (US); John M. Kowalski, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 63 days.

(21) Appl. No.: 13/408,910

(22) Filed: Feb. 29, 2012

(65) Prior Publication Data

US 2013/0223356 A1     Aug. 29, 2013

(51) Int. Cl.
| | |
|---|---|
| *H04W 4/00* | (2009.01) |
| *H04W 72/04* | (2009.01) |
| *H04W 92/18* | (2009.01) |

(52) U.S. Cl.
CPC .......... *H04W 72/042* (2013.01); *H04W 72/044* (2013.01); *H04W 92/18* (2013.01)

(58) Field of Classification Search
CPC .................................... H04W 76/023
USPC ................... 370/329; 455/509, 522
See application file for complete search history.

(56) References Cited

U.S. PATENT DOCUMENTS

| | | | | |
|---|---|---|---|---|
| 7,308,266 | B2 * | 12/2007 | Du et al. ........................ | 455/445 |
| 7,336,638 | B2 * | 2/2008 | Cheng et al. .................. | 370/338 |
| 8,180,351 | B2 * | 5/2012 | Stanforth ....................... | 455/445 |
| 8,233,462 | B2 * | 7/2012 | Walton et al. ................. | 370/338 |
| 8,385,240 | B2 * | 2/2013 | Krishnaswamy ............. | 370/311 |
| 8,526,347 | B2 * | 9/2013 | Wang et al. ................... | 370/311 |
| 2006/0168343 | A1 * | 7/2006 | Ma et al. ........................ | 709/245 |
| 2006/0258382 | A1 * | 11/2006 | Zhang et al. .................. | 455/501 |
| 2008/0310329 | A1 * | 12/2008 | Sun et al. ...................... | 370/280 |
| 2008/0310430 | A1 * | 12/2008 | He ................................. | 370/400 |
| 2010/0246457 | A1 * | 9/2010 | Zhou et al. .................... | 370/294 |
| 2010/0261469 | A1 | 10/2010 | Ribeiro et al. | |
| 2011/0103319 | A1 * | 5/2011 | Abraham et al. ............. | 370/329 |
| 2011/0134827 | A1 | 6/2011 | Hooli et al. | |
| 2011/0255450 | A1 * | 10/2011 | Wang et al. ................... | 370/280 |
| 2011/0268004 | A1 | 11/2011 | Doppler et al. | |
| 2011/0268006 | A1 * | 11/2011 | Koskela et al. ............... | 370/312 |
| 2011/0300892 | A1 | 12/2011 | Hakola et al. | |
| 2011/0305179 | A1 * | 12/2011 | Wang et al. ................... | 370/311 |

(Continued)

FOREIGN PATENT DOCUMENTS

| | | | |
|---|---|---|---|
| EP | 2288222 | * | 8/2011 |
| WO | 2011/135555 | | 11/2011 |
| WO | 2012/016378 | | 2/2012 |

OTHER PUBLICATIONS

3GPP TS 36.321 ver 8.0.0 Rel. 8, Dec. 2007.*

(Continued)

*Primary Examiner* — Mark Rinehart
*Assistant Examiner* — Peter Solinsky
(74) *Attorney, Agent, or Firm* — Austin Rapp & Hardman

(57) ABSTRACT

An evolved Node B (eNB) for allocating resources for a device-to-device (D2D) link between User Equipments (UEs) is described. The eNB includes a processor and instructions stored in memory that is in electronic communication with the processor. The eNB allocates resources for a D2D signal. The D2D signal is transmitted or received by the UE in uplink spectrum in a case of Frequency Division Duplexing (FDD) or in uplink subframes in a case of Time Division Duplexing (TDD).

18 Claims, 25 Drawing Sheets

(56) References Cited

U.S. PATENT DOCUMENTS

| | | | |
|---|---|---|---|
| 2012/0020213 A1* | 1/2012 | Horneman et al. | 370/231 |
| 2012/0083283 A1* | 4/2012 | Phan et al. | 455/450 |
| 2012/0129540 A1* | 5/2012 | Hakola et al. | 455/450 |
| 2012/0129562 A1* | 5/2012 | Stamoulis et al. | 455/517 |
| 2012/0236783 A1* | 9/2012 | Park et al. | 370/315 |
| 2012/0282936 A1* | 11/2012 | Gao et al. | 455/450 |
| 2013/0022138 A1* | 1/2013 | Kwak et al. | 375/260 |
| 2013/0065585 A1* | 3/2013 | Pelletier et al. | 455/435.1 |
| 2013/0100864 A1* | 4/2013 | Mukherjee et al. | 370/280 |
| 2013/0121227 A1* | 5/2013 | Abraham et al. | 370/311 |
| 2013/0136006 A1* | 5/2013 | Kim et al. | 370/241 |
| 2013/0148642 A1* | 6/2013 | Abraham et al. | 370/338 |
| 2013/0148643 A1* | 6/2013 | Abraham et al. | 370/338 |
| 2013/0170468 A1* | 7/2013 | Baker et al. | 370/330 |
| 2013/0170476 A1* | 7/2013 | Baker et al. | 370/336 |
| 2013/0178221 A1* | 7/2013 | Jung et al. | 455/450 |
| 2013/0223318 A1* | 8/2013 | Liu et al. | 370/312 |

OTHER PUBLICATIONS

Povey, Gordon, J. R., Time Division Duplex—Code Division Multiple Access for Mobile Multimedia Services, 0-7803-3871-5/97/$10.00 0 1997 IEEE.*

International Search Report issued for International Application No. PCT/JP2013/001026 on Apr. 2, 2013.

3GPP TS 36.213 V10.2.0, "Evolved Universal Terrestrial Radio Access (E-UTRA); Physical Layer Procedures (Release 10)," Jun. 2011.

3GPP TS 36.211 V10.2.0, "Evolved Universal Terrestrial Radio Access (E-UTRA); Physical Channels and Modulation (Release 10)," Jun. 2011.

3GPP TS 36.212 V10.2.0, "Evolved Universal Terrestrial Radio Access (E-UTRA); Multiplexing and Channel Coding (Release 10)," Jun. 2011.

* cited by examiner

ALLOCATING AND DETERMINING RESOURCES FOR A DEVICE-TO-DEVICE LINK

TECHNICAL FIELD

The present disclosure relates generally to communication systems. More specifically, the present disclosure relates to allocating and determining resources for a device-to-device link.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may communicate with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may typically communicate with each other by way of a base station. However, only communicating via a base station may offer limited flexibility. As illustrated by this discussion, systems and methods that improve communication flexibility may be beneficial.

DETAILED DESCRIPTION

Figure 1:
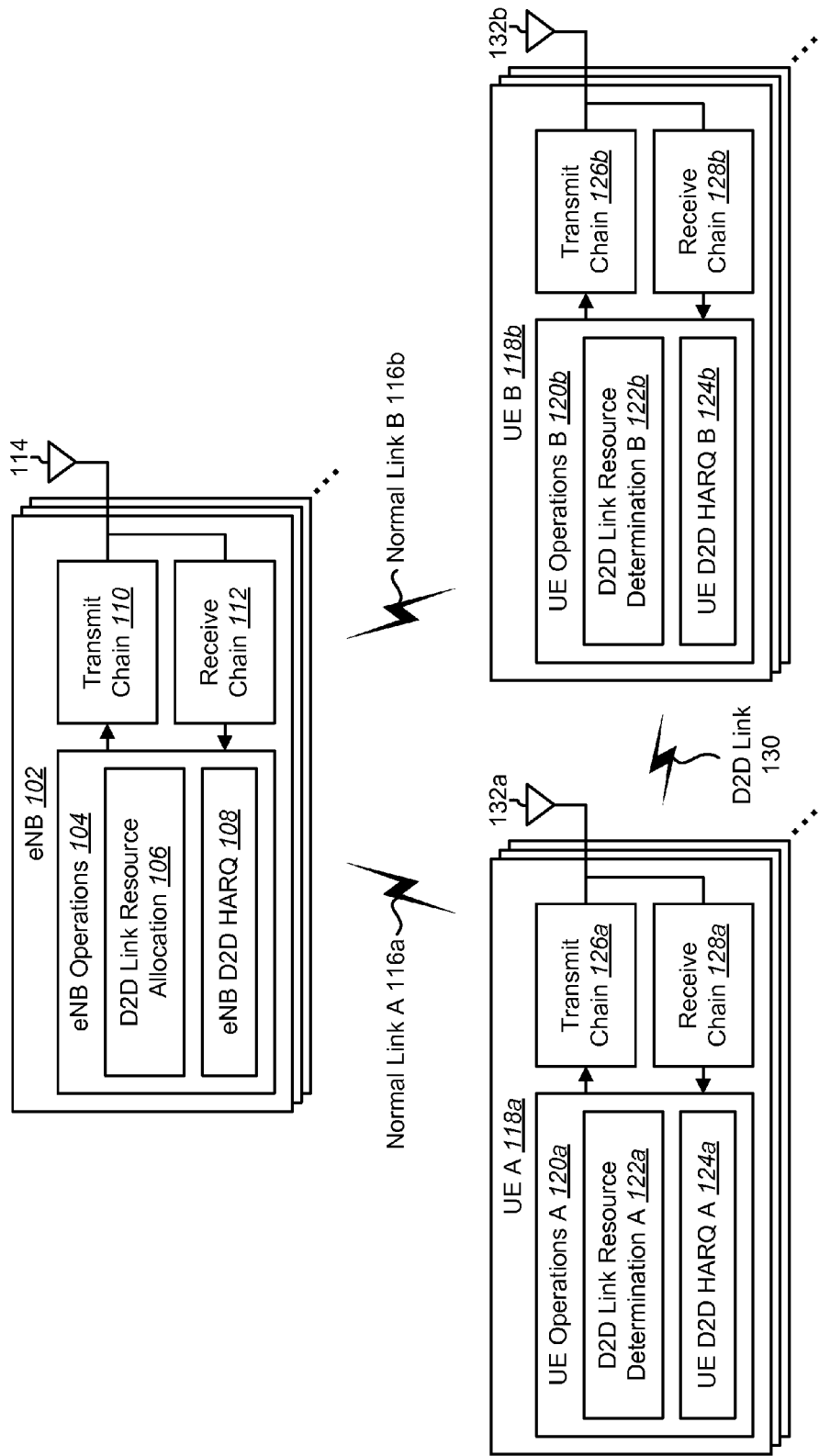
FIG. 1 is a block diagram illustrating one configuration of one or more evolved Node Bs (eNBs) and one or more User Equipments (UEs) in which systems and methods for allocating and determining resources for a device-to-device (D2D) link 130 may be implemented.

An eNB for allocating resources for a D2D link between UEs is described. The eNB includes a processor and instructions in memory that is in electronic communication with the processor. The eNB allocates resources for a D2D link by using at least one PDCCH. The eNB also indicates a D2D link direction. The resources may correspond to a Physical Uplink Shared Channel (PUSCH). Indicating the D2D link direction may be based on at least one of a Radio Network Temporary Identifier (RNTI), bits in a payload field of Downlink Control Information (DCI) and Radio Resource Control (RRC) signaling. The eNB may also receive Acknowledgement/Negative Acknowledgement (Ack/Nack) information corresponding to the D2D link.

One PDCCH may be sent per UE. One PDCCH may be sent for one or more transmitting UEs and one or more receiving UEs. One PDCCH may be sent for one or more transmitting UEs and a separate PDCCH may be sent for one or more receiving UEs.

The eNB may also indicate whether the at least one PDCCH corresponds to the D2D link. Indicating whether the at least one PDCCH corresponds to the D2D link may be based on at least one of a Downlink Control Information (DCI) format and a Radio Network Temporary Identifier (RNTI).

A UE for determining resources for a D2D link is also described. The UE includes a processor and instructions in memory that is in electronic communication with the processor. The UE determines that a PDCCH corresponds to a D2D link. The UE also determines resources for the D2D link. The UE further determines a D2D link direction. The resources may correspond to a PUSCH. The UE may also transmit Ack/Nack information corresponding to the D2D link if the UE is a receiving UE. The Ack/Nack information may be transmitted on a Physical Uplink Control Channel (PUCCH), enhanced (or extended) PUCCH (ePUCCH), Physical Uplink Shared Channel (PUSCH) or enhanced (or extended) PUSCH (ePUSCH).

The PDCCH may be specific to the UE. The PDCCH may correspond to all UEs involved in the D2D link. The PDCCH may correspond to one or more transmitting UEs or may correspond to one or more receiving UEs.

Determining that the PDCCH corresponds to the D2D link is based on at least one of a DCI format and a RNTI. Determining the D2D link direction may be based on at least one of a RNTI, bits in a payload field of DCI and RRC signaling.

A method for allocating resources for a D2D link between UEs by an eNB is also described. The method includes allocating resources for a D2D link by using at least one PDCCH. The method also includes indicating a D2D link direction.

A method for determining resources for a device-to-device (D2D) link by a UE is also described. The method includes determining that a PDCCH corresponds to a D2D link. The method also includes determining resources for the D2D link. The method further includes determining a D2D link direction.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home eNB (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency band) to be used for communication between a Node B (e.g., eNodeB) and a UE. "Configured cells" are those cells of which the UE is aware and is allowed by a Node B (e.g., eNB) to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE may monitor the PDCCH or enhanced PDCCH (ePDCCH) and in the case of a downlink transmission, those cells for which the UE decodes a Physical Downlink Shared Channel (PDSCH) or enhanced (or extended) PDSCH (ePDSCH). "Deactivated cells" are those configured cells for which the UE is not monitoring the transmitted PDCCH or ePDCCH. It should be noted that a "cell" may be described in terms of differing dimensions. For example, a "cell" may have temporal, spatial (e.g., geographical) and frequency characteristics.

The systems and methods disclosed herein may enable device-to-device communications. Device-to-device (which may be referred to as D2D) under E-UTRAN or 3GPP-LTE-Advanced specifications is a mode of communication that operates on a cellular network in which the data traffic from one UE (e.g., UE A), to another UE (e.g., UE B), may not pass through the core network or the centralized base station. Instead, the data traffic may be transmitted directly from UE A to UE B in this mode. Depending on the level of engagement and control of the underlying E-UTRAN network, all, some or none of the control signaling related to the D2D packet transmission may be managed or generated by the underlying core network or base station. One of the benefits of the systems and methods described herein is to enable a flexible and yet controlled resource allocation of licensed spectrum by an eNB.

One of the control signals related to a data packet transmission is the corresponding acknowledgement/negative-acknowledgement (Ack/Nack) packet. One example of Ack/Nack is Hybrid Automatic Repeat Request (HARQ) Ack/Nack (e.g., HARQ-ACK, etc.). HARQ Ack/Nack may be transmitted from a receiving device to a transmitting device that indicates whether a packet (sent by the transmitting device) is received successfully at the receiving device.

The systems and methods disclosed herein describe transmission of HARQ Ack/Nack corresponding to the transmission of data on a D2D communication link. For example, the systems and methods disclosed herein describe resource allocation and related signaling for a data transmission on a D2D communication link, network controlled transmission of HARQ Ack/Nack and procedures for data and HARQ Ack/Nack transmissions.

Some aspects of the systems and methods disclosed herein are given as follows. An eNB may control a HARQ procedure for a D2D link. An eNB may control resource allocation to a transmitting UE and to a receiving UE for a D2D link between the transmitting UE and the receiving UE for each transmission or retransmission. Additionally or alternatively, the eNB may control communication of HARQ-ACK from receiving UEs to the eNB for each HARQ transmission or retransmission.

An eNB may send at least one PDCCH corresponding to a D2D communication link to both transmitter(s) and receiver(s) for each HARQ transmission or retransmission. In one example, one PDCCH may be sent per UE. For instance, information for a receiving UE and information for a transmitting UE may be separately coded. In another example, one PDCCH may be sent per D2D transmission. In this case, information for one or more receiving UEs and one or more transmitting UEs may be jointly coded. In yet another example, a first PDCCH may be sent for a transmitting UE group and a second PDCCH may be sent for a receiving UE group. For instance, information for receiving UEs and information for a transmitting UE may be separately coded.

In accordance with the systems and methods disclosed herein, a PDCCH correspondence to a D2D communication link and to a normal link may be indicated (by an eNB, for example) and determined (by a UE, for example). Additionally or alternatively, the direction of transmission in a D2D communication link may be indicated and determined. Additionally or alternatively, Ack/Nack corresponding to a D2D communication link may be sent to an eNB. More detail is given below regarding aspects of the systems and methods disclosed herein.

More detail regarding the transmission of data and corresponding HARQ Ack/Nack in E-UTRAN is given as follows. At any given subframe (e.g., subframe number n) in which a downlink transmission is scheduled, each UE monitors the physical downlink control channel (PDCCH). It should be noted that this is true for both TDD and FDD communications. Control information in the downlink is transmitted in individual packets known as DCI. Each DCI may take one of several formats. Each DCI format is designed to perform a specific task. For example, one DCI format is designed for allocating resources for uplink transmission and another DCI format is designed for allocating resources for downlink transmission.

The downlink control information is divided into two categories: cell-specific control information and UE-specific control information. The cell-specific control information is decoded by all active UEs that receive PDCCH information and contains system control information that concerns all or a group of UEs. In contrast, the UE-specific control information is received (e.g., decoded) only by a single UE and contains control information targeted to a specific UE. The resources allocated for the transmission of PDCCH information are divided into two regions. In one region, the cell-specific DCIs are transmitted. In another region, UE-specific DCIs are transmitted. It should be noted that a DCI may also be referred to as a PDCCH in some instances.

At the eNB, the Cyclic Redundancy Check (CRC) of each DCI is scrambled by a specific sequence. The CRC of the cell-specific DCIs are scrambled by a sequence that is known to all or a group of targeted UEs and the CRC of the UE-specific DCIs are scrambled by a sequence known only to the targeted UE. In E-UTRAN, the scrambling sequence may be one of the Radio Network Temporary Identifications (RNTIs). The CRC of the UE-specific DCIs are scrambled by Cell RNTI (C-RNTI) whereas the CRC of the cell-specific DCIs are scrambled by, for example, Paging RNTI (P-RNTI), System Information RNTI (SI-RNTI) or Random Access RNTI (RA-RNTI). The UE monitors a set of PDCCH candidates, where monitoring implies attempting to decode each of the PDCCHs in the set according to all the monitored DCI formats. A DCI may be discovered and decoded if the UE successfully checks the CRC of the PDCCH candidate using one of its cell-specific or UE-specific RNTIs.

For a downlink HARQ procedure, a UE monitors a PDCCH addressing a PDSCH in subframe n, where the PDCCH and the PDSCH are in the same subframe n. If a PDSCH is scheduled in subframe n, the UE sends HARQ-ACK on a PUCCH in subframe n+k (where k=4 for FDD and k≥4 for TDD, for example). The eNB may send a PDCCH for retransmission for this data at or after subframe n+k+4 (for asynchronous HARQ in the downlink, for example).

For an uplink HARQ procedure, a UE monitors a PDCCH addressing a Physical Uplink Shared Channel (PUSCH) in subframe n, where the PUSCH is scheduled in subframe n+k (where k=4 for FDD and k≥4 for TDD, for example). The eNB can send a PDCCH for retransmission for this data or a Physical HARQ Indicator Channel (PHICH) for positive or negative acknowledgement at subframe n+k+4 (for synchronous HARQ in the uplink, for example).

In some configurations (in E-UTRAN or LTE-Advanced, for example) the resources for downlink or uplink data (including application data and system control information that are transmitted together with data on the PDSCH or PUSCH are scheduled or allocated using the PDCCH. Similarly, for scheduling and allocating resources for D2D communication, the control information may be transmitted on a PDCCH or on an extended or enhanced PDCCH (ePDCCH or e-PDCCH). An eNB may control a HARQ procedure for a D2D link, including allocating resources for a D2D link (from the eNB) to a transmitting UE and to a receiving UE for each transmission or retransmission. An eNB may also control transmission of Hybrid Automatic Repeat Request Acknowledgement (HARQ-ACK) information from one or more receiving UEs to the eNB for each HARQ transmission or retransmission.

More detail regarding a DCI format for a PDCCH for D2D resource allocation is given as follows. Error detection may be provided on DCI transmissions through a Cyclic Redundancy Check (CRC). The entire PDCCH payload may be used to calculate CRC parity bits. The CRC parity bits may be scrambled with a corresponding RNTI.

A PDCCH may be indicated and determined as a normal link PDCCH (e.g., corresponding to a normal link, the communication between eNB and UE) or a D2D link PDCCH (e.g., corresponding to a D2D link, the communication between or among devices). For example, the scheduling between a normal link and a D2D link may be dynamically switched according to a PDCCH, since a UE with a D2D link should also have normal link.

In some configurations, a PDCCH may be indicated and determined as a normal link PDCCH or a D2D link PDCCH based on a DCI format. In other words, the PDCCH correspondence between a normal link and a D2D link may be indicated and determined based on DCI format. In some configurations, a new DCI format may be used to indicate and determine PDCCH correspondence to a D2D link. In this case, the UE needs to monitor both an existing DCI format and the new DCI format. As used herein, a "new DCI format" may be a DCI format that is different from the DCI formats given in Release 10 of 3GPP specifications. This may increase the amount of blind decoding performed. In other configurations, since the difference between a normal link and a D2D link may be identified based on the DCI format, a normal C-RNTI may be used for scrambling the PDCCH (e.g., the CRC of the PDCCH) for a D2D link.

In some configurations, a PDCCH may be identified and determined as a normal link PDCCH or a D2D link PDCCH based on a RNTI. In other words, the PDCCH correspondence between a normal link and a D2D link may be indicated and determined based on a RNTI. In some configurations, existing DCI formats may be utilized. For example, if an existing DCI format that is Format 0 (indicating uplink resource allocation for a single antenna port mode, for example) or that is Format 4 (indicating uplink resource allocation for spatial multiplexing, for example) is used for a D2D link, a UE may need to monitor an existing DCI format with a different RNTI for a D2D link. This may not increase the amount of blind decoding since the same DCI format is being used. This approach can also be applied for a new DCI format as well.

The systems and methods disclosed herein may enable indicating and determining a direction for a D2D link (e.g., which UE is a transmitting UE and which UE is a receiving UE). The direction of D2D link (e.g., which UE is a transmitting and which UE is a receiving UE), may be dynamically switched based on a PDCCH or semi-statically switched based on Radio Resource Control (RRC) signaling.

In some configurations, D2D link direction may be indicated and determined based on a RNTI. Each UE that is involved in a D2D link may be informed (by an eNB of) its own RNTI and/or one or more RNTIs corresponding to other UEs. In some configurations, if a UE detects its own RNTI, the UE may determine itself to be a transmitting UE. Otherwise, the UE may determine itself to be a receiving UE.

In some configurations, D2D link direction may be indicated and determined based on bits in a payload field in DCI. For example, a DCI payload field for a D2D link may include bits that indicate D2D link direction. If a first approach or a third approach for resource allocation (described below) is used, one bit is enough to indicate whether the corresponding PDCCH is for a transmitting UE or a receiving UE.

If a second approach for resource allocation (described below) is used, the number of bits depends on the potential number of transmitting UEs. Assuming that there are two UEs (e.g., UE A and UE B) in a D2D link, if only UE A can be a transmitting UE, there is no need of identification bits in DCI, which is a kind of semi-static switching based on RRC signaling as described herein. If UE A and UE B can be a transmitting UE, one bit that indicates which is a transmitting UE may be required. Assuming that there are four UEs (UE A, UE B, UE C and UE D) in a D2D link, if UE A and UE B can be a transmitting UE, a one-bit indication may be required. If UE A, UE B, UE C, and UE D can be a transmitter, a two-bit indication regarding which UE is a transmitting UE may be required.

If the number of bits for this identification is relatively small, an existing DCI format (e.g., DCI format 0 or DCI format 4) may be used with some modification. Otherwise, a new DCI format (e.g., a DCI format that is different from the DCI formats in Release 10 of 3GPP specifications) may be utilized.

In some configurations, a D2D link direction may be indicated and determined based on RRC signaling. Each UE that is involved in a D2D link may be informed whether the UE is a transmitting UE or a receiving UE by RRC signaling. In other words, an eNB may indicate a D2D link direction by sending RRC signaling (e.g., semi-statically). A UE may determine the D2D link direction based on the RRC signaling. If a UE detects a DCI for a D2D link, the UE may transmit or receive according to the direction indicated.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of one or more evolved Node Bs (eNBs) 102 and one or more User Equipments (UEs) 118 in which systems and methods for allocating and determining resources for a D2D link 130 may be implemented. One or more eNBs 102 may communicate with one or more UEs 118a-b over one or more normal links 116a-b. For example, the eNB 102 may communicate with UE A 118a over normal link A 116a and may communicate with UE B 118b over normal link B 116b.

An eNB 102 may include an eNB operations module 104, a transmit chain 110, a receive chain 112 and one or more antennas 114. As using herein, the term "module" may indicate that a particular element or component may be implemented in hardware, software, firmware or a combination thereof. For example, the eNB operations module 104 may be implemented in hardware (e.g., circuitry), software (e.g., instructions that are executable by a processor) or a combination of both.

The transmit chain 110 may prepare signals (e.g., data and control information) for transmission. For example, the transmit chain 110 may prepare control information supplied by the eNB operations module 104 and provide it to one or more antennas 114 for transmission. The transmit chain 110 may include one or more modules that enable the eNB 102 to transmit signals (e.g., data and/or control information). In some implementations, for example, the transmit chain 110 may include one or more encoders, one or more scrambling modules, one or more modulation mappers, one or more interleavers, a layer mapper, a pre-coding module, one or more resource element mappers and one or more Orthogonal Frequency-Division Multiplexing (OFDM) signal generation modules.

For instance, the transmit chain 110 may format and transmit signals that include data and control information. The transmit chain 110 may scramble control information based on a RNTI (e.g., Cell RNTI (C-RNTI), Paging RNTI (P-RNTI), System Information RNTI (SI-RNTI), Random Access RNTI (RA-RNTI), etc.). Additionally or alternatively, the transmit chain 110 may encode, interleave, modulate, map (to spatial streams or layers), precode, upconvert, filter and amplify (or otherwise format) data and control information for transmission.

The receive chain 112 may receive signals from the one or more antennas 114. For example, the receive chain 112 may receive, detect and de-format data and control information from the one or more antennas 114. The receive chain 112 may include one or more modules that enable the eNB 102 to receive signals (e.g., data and/or control information). In some implementations, for example, the receive chain 112 may include a receive signal detector, one or more demodulators, one or more decoders, one or more deinterleavers and one or more descramblers.

For instance, the receive chain 112 may receive and deformat signals that include data and control information. The receive chain 112 may amplify, downconvert, detect, demodulate, decode, filter and descramble (or otherwise deformat) received signals to produce received data and control information. Received control information may be provided to the eNB operations module 104.

The eNB operations module 104 may enable the eNB 102 to allocate resources for D2D communications between UEs 118. For example, the eNB operations module 104 includes a D2D link resource allocation module 106. The D2D link resource allocation module 106 may allocate resources for a D2D link between UEs 118 from uplink time and frequency resources. For example, the D2D link resource allocation module 106 may generate one or more PDCCHs that allocate resources to the UEs 118 for a D2D link 130. For instance, the one or more PDCCHs include control information that indicates a schedule for communicating (e.g., transmitting and receiving) data on the D2D link 130. More detail regarding the allocation of resources for a D2D link 130 is given below.

The D2D link resource allocation module 106 may also indicate whether a PDCCH corresponds to a normal link 116 or to the D2D link 130. In some configurations, this may be indicated based on a DCI format. In other configurations, this may be indicated based on one or more RNTIs. More detail on indicating whether a PDCCH corresponds to a normal link 116 or a D2D link 130 is given below.

The D2D link resource allocation module 106 may also indicate a D2D link direction. For example, the D2D link resource allocation module 106 may use one or more approaches that indicate which UE 118 is a transmitting UE and which UE 118 is a receiving UE. In some configurations, the D2D link direction may be indicated based on one or more RNTIs. In other configurations, the D2D link direction may be indicated based on a DCI (e.g., one or more identification bits in a payload field of a DCI). In yet other configurations, the D2D link direction may be indicated based on RRC signaling. More detail on indicating a D2D link direction is given above and below.

In some configurations, the eNB operations module 104 may enable the eNB 102 to manage HARQ procedures corresponding to the D2D link 130. For example, the eNB operations module 104 may include an eNB D2D HARQ module 108. The eNB D2D HARQ module 108 may receive Ack/Nack information corresponding to the D2D link 130 from a UE 118. For example, a UE 118 may transmit the Ack/Nack information to the eNB 102 and the eNB 102 may receive the Ack/Nack information on a PUCCH, ePUCCH, PUSCH or ePUSCH. In some configurations, the Ack/Nack information may be utilized to determine whether further resource allocation (for a retransmission, for example) on the D2D link 130 is needed. The eNB 102 (e.g., eNB D2D HARQ module 108) may or may not forward this Ack/Nack information to another UE 118.

For example, assume that UE A 118a is a transmitting UE (e.g., a UE that transmits data on the D2D link 130) and that UE B 118b is a receiving UE (e.g., a UE that receives data on the D2D link 130). UE A 118a transmits data to UE B 118b on the D2D link 130. For data that is successfully received, UE B 118b may generate one or more Acknowledgements (Acks). For data that is unsuccessfully (or not) received, UE B 118b may generate one or more Negative Acknowledgements (Nacks). UE B 118b then sends the Ack/Nack information to the eNB 102. The eNB 102 (e.g., eNB D2D HARQ module 108) receives the Ack/Nack information and allocates additional resources on the D2D link 130 to UE A 118a. The eNB 102 may or may not forward the Ack/Nack information to UE A 118a. UE A 118a may retransmit any data that was unsuccessfully (or not) received to UE B 118b.

In some configurations, the eNB 102 does not forward the Ack/Nack information to the transmitting UE (e.g., UE A 118a). In this case, the PDCCH transmitted from the eNB 102 to the transmitting UE (e.g., UE A 118a) for granting (e.g., allocating, scheduling, etc.) resources for D2D communication may signal the transmitting UE to send new data or to retransmit the previously transmitted data. In this configuration, the transmitting UE (e.g., UE A 118a) can infer, implicitly, whether the previously transmitted data (e.g., packet) was received successfully by the receiving UE (e.g., UE B 118b).

In the PDCCH related to resource allocation for data transmission, for example, there is a field indicating new data or retransmission of previous data (along with other parameters such as a redundancy version to be used for retransmission, for example). The value of this new data indicator may be determined by the eNB 102 based on the Ack/Nack information received from a receiving UE (e.g., UE B 118b). However, if the Ack/Nack information (e.g., bits) is sent to the transmitting UE (e.g., UE A 118a), then additional bits may be required for explicit transmission of those bits to the transmitting UE (e.g., UE A 118a).

Thus, in some configurations, the eNB 102 determines the transmission of new data or retransmission on the D2D link 130 for a transmitting UE (e.g., UE A 118a). In other configurations, the eNB 102 sends the Ack/Nack information to the transmitting UE (e.g., UE A 118a).

Each of the UEs 118a-b may respectively include one or more antennas 132a-b, a transmit chain 126a-b, a receive chain 128a-b and a UE operations module 120a-b. Each UE operations module 120a-b may respectively include a D2D link resource determination module 122a-b. One or more of the UE operations modules 120a-b may optionally include a UE D2D HARQ module 124a-b.

In respective UEs 118a-b, each transmit chain 126a-b may prepare signals (e.g., data and control information) for transmission. For example, each transmit chain 126a-b may prepare control information supplied by the respective UE operations module 120a-b and provide it to one or more respective antennas 132a-b for transmission. Each transmit chain 126a-b may include one or more modules that enable the UE 118a-b to transmit signals (e.g., data and/or control information). In some implementations, for example, each transmit chain 126a-b may include one or more encoders, one or more scrambling modules, one or more modulation mappers, one or more interleavers, a layer mapper, a pre-coding module, one or more resource element mappers and one or more Orthogonal Frequency-Division Multiplexing (OFDM) signal generation modules.

For instance, each transmit chain 126a-b may format and transmit signals that include data and control information. The transmit chain 126a-b may scramble control information based on a RNTI (e.g., Cell RNTI (C-RNTI), Paging RNTI (P-RNTI), Random Access RNTI (RA-RNTI), etc.). Additionally or alternatively, the transmit chain 126a-b may encode, interleave, modulate, map (to spatial streams or layers), precode, upconvert, filter and amplify (or otherwise format) data and control information for transmission.

Each receive chain 128a-b may receive signals from the one or more respective antennas 132a-b. For example, each receive chain 128a-b may receive, detect and de-format data and control information from the one or more respective antennas 132a-b. Each receive chain 128a-b may include one or more modules that enable the respective UEs 118a-b to receive signals (e.g., data and/or control information). In some implementations, for example, each receive chain 128a-b may include a receive signal detector, one or more demodulators, one or more decoders, one or more deinterleavers and one or more descramblers.

For instance, each receive chain 128a-b may receive and de-format signals that include data and control information. Each receive chain 128a-b may amplify, downconvert, detect, demodulate, decode, filter and descramble (or otherwise de-format) received signals to produce received data and control information. Received control information may be provided to each respective UE operations module 120a-b.

Each UE operations module 120a-b may respectively include a D2D link resource determination module 122a-b. Each D2D link resource determination module 122a-b may determine resources that are allocated for the D2D link 130. For example, each UE 118a-b may receive one or more PDCCHs. Each D2D link resource determination module 122a-b may make one or more determinations regarding the D2D link 130. For instance, the D2D link resource determination modules 122a-b may determine which time and frequency resources are allocated for the D2D link 130.

Each D2D link resource determination module 122a-b may determine whether a received PDCCH corresponds to a normal link 116 or to the D2D link 130. In some configurations, this determination may be based on a DCI format. In other configurations, this determination may be based on one or more RNTIs. More detail on determining whether a PDCCH corresponds to a normal link 116 or a D2D link 130 is given below.

Each D2D link resource determination module 122a-b may also determine a D2D link direction. For example, each D2D link resource determination module 122a-b may use one or more approaches to determine whether the corresponding UE 118a-b is a transmitting UE or a receiving UE. For instance, D2D link resource determination module A 122a may determine whether UE A 118a is a transmitting UE or a receiving UE for the D2D link 130. In some configurations, the D2D link direction may be determined based on one or more RNTIs. In other configurations, the D2D link direction may be determined based on a DCI (e.g., one or more identification bits in a payload field of a DCI). In yet other configurations, the D2D link direction may be determined based on RRC signaling. More detail on determining a D2D link direction is given above and below.

One of more of the UE operations modules 120 may optionally include a UE D2D HARQ module 124. The UE D2D HARQ modules 124a-b may perform HARQ operations corresponding to the D2D link 130. For example, assume that UE A 118a is a transmitting UE and that UE B 118b is a receiving UE. UE D2D HARQ module B 124b may generate Ack/Nack information corresponding to data on the D2D link 130 and send it to the eNB 102 on normal link B 116b. For instance, UE D2D HARQ module B 124b may generate an Ack for data that is successfully received on the D2D link 130. UE D2D HARQ module B 124b may generate a Nack for data that is unsuccessfully (or not) received on the D2D link 130. This Ack/Nack information may then be sent to the eNB 102 on normal link B 116b.

In some configurations, the eNB 102 may send (e.g., forward) the Ack/Nack information received from UE B 118b (on normal link B 116b) to UE A 118a on normal link A 116a. UE A 118a may receive the Ack/Nack information on normal link A 116a. UE D2D HARQ module A 124a may retransmit data on the D2D link 130 based on the Ack/Nack information. For example, if a Negative Acknowledgement (Nack) is received on normal link A 116a corresponding to the D2D link 130, UE D2D HARQ module A 124 may retransmit corresponding data on the D2D link 130. This retransmission may be carried out based on resources allocated by the eNB 102 for the D2D link 130. However, if only Acknowledgements (Acks) and no Nacks are received, UE D2D HARQ module A 124a may not retransmit any corresponding data.

It should be noted that one or more of the elements or parts thereof included in the eNB 102 and UEs 118 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
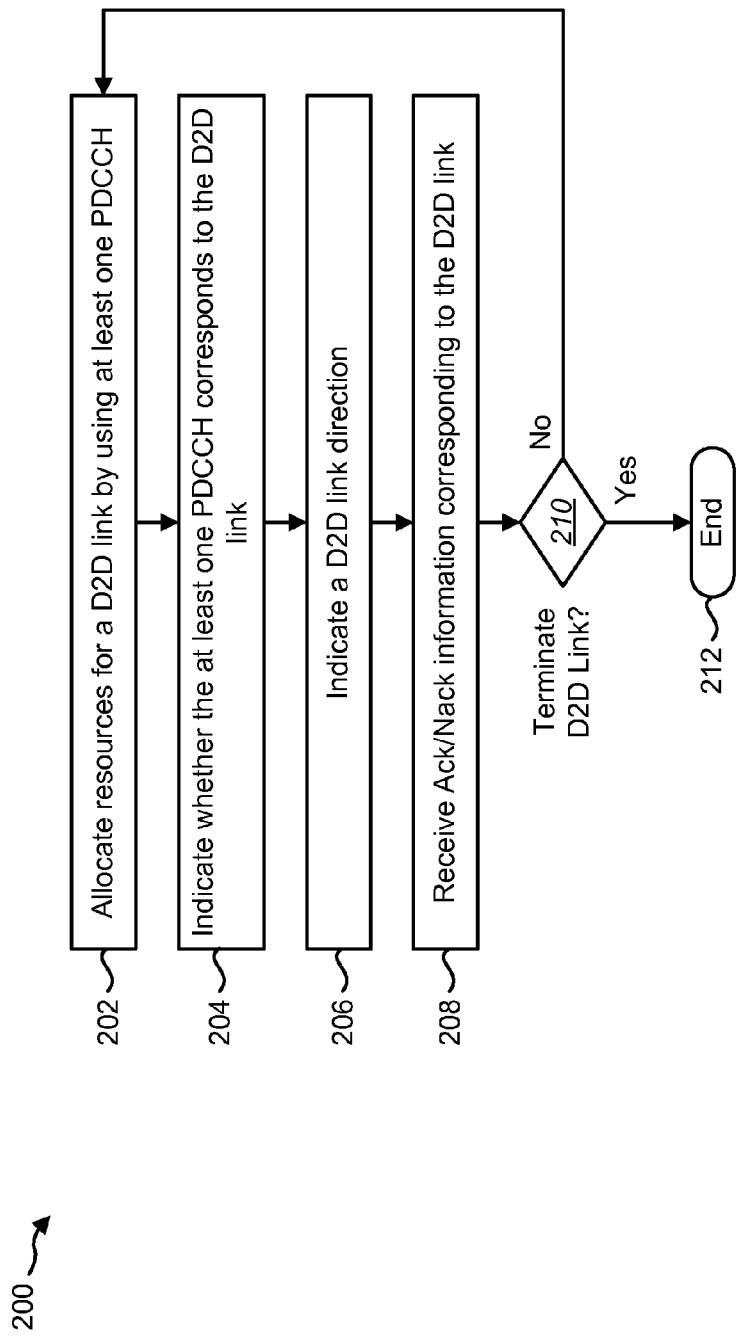
FIG. 2 is a flow diagram illustrating one configuration of a method for allocating resources for a D2D link.

FIG. 2 is a flow diagram illustrating one configuration of a method 200 for allocating resources for a D2D link. An eNB 102 may allocate 202 resources for a D2D link 130 by using at least one PDCCH. In other words, a message for resource allocation may be carried in at least one PDCCH. The resources allocated 202 may correspond to a PUSCH. It should be noted that the term "PDCCH" may refer to a PDCCH to an enhanced PDCCH (ePDCCH) and/or to a DCI.

In a first approach for allocating 202 resources, the eNB 102 may send one PDCCH per UE 118. For example, each PDCCH is separately coded for each UE 118. In a second approach for allocating 202 resources, the eNB 102 may send one PDCCH for all UEs 118 (per D2D transmission, for example). For instance, control information (in the PDCCH) for transmitting UEs and control information (in the PDCCH) for receiving UEs is jointly coded. In a third approach for allocating 202 resources, the eNB 102 may send two PDCCHs (per D2D transmission, for example). One of the PDCCHs corresponds to one or more transmitting UEs and the other PDCCH corresponds to one or more receiving UEs. For example, control information (in the PDCCH) for transmitting UEs and control information (in the PDCCH) for receiving UEs is separately coded. More detail regarding these approaches for resource allocation is given below.

The eNB 102 may indicate 204 whether the at least one PDCCH corresponds to the D2D link 130. For example, the eNB 102 may provide an indication regarding whether a PDCCH corresponds to a D2D link 130 as opposed to a normal link 116. In some configurations, the eNB 102 may indicate 204 this based on a DCI format. In other configurations, the eNB 102 may indicate 204 this based on one or more RNTIs (e.g., scrambling CRC of DCI based on one or more RNTIs). More detail on indicating 204 whether a PDCCH corresponds to a normal link 116 or a D2D link 130 is given below.

The eNB 102 may indicate 206 a D2D link direction. For example, the eNB 102 may use one or more approaches that indicate which UE 118 is a transmitting UE and which UE 118 is a receiving UE. In some configurations, the eNB 102 may indicate 206 a D2D link direction based on one or more RNTIs. In other configurations, the eNB 102 may indicate 206 a D2D link direction based on a DCI (e.g., one or more identification bits in a payload field of a DCI). In yet other configurations, the eNB 102 may indicate 206 a D2D link direction based on RRC signaling. More detail on indicating 206 a D2D link direction is given above.

In some configurations, the eNB 102 may receive 208 Ack/Nack information corresponding to the D2D link 130. For example, the eNB 102 may receive 208 Ack/Nack information corresponding to the D2D link 130 from a receiving UE (e.g., a UE 118 designated to receive data via the D2D link 130). For instance, a receiving UE 118 may transmit the Ack/Nack information to the eNB 102 and the eNB 102 may receive the Ack/Nack information on a PUCCH, ePUCCH, PUSCH or ePUSCH. It should be noted that the eNB 102 may or may not send (e.g., forward) the received 208 Ack/Nack information to a transmitting UE on a normal link 116. More detail on receiving 208 Ack/Nack information corresponding to the D2D link 130 is given above and below.

The eNB 102 may determine 210 whether to terminate the D2D link 130. In some configurations, this determination 210 may be based on the received 208 Ack/Nack information. For example, if the Ack/Nack information indicates a Nack (e.g., that retransmission of some data in the D2D link 130 is required), then the eNB 102 may determine 210 not to terminate the D2D link 130. The eNB 102 may then return to allocate 202 resources for a D2D link (for retransmission).

In another example, the eNB 102 may determine 210 not to terminate the D2D link 130 if an Ack is received (and more data remains to be sent on the D2D link 130). For example, the eNB 102 may receive an Ack, indicating that a D2D transmission was received successfully. Additionally or alternatively, the eNB 102 may receive an indication of the amount of data to be sent on the D2D link 130 for allocating 202 resources. Accordingly, if more data remains to be sent on the D2D link 130, for instance, the eNB 102 may determine 210 not to terminate the D2D link 130 and may return to allocate 202 resources.

The eNB 102 may determine 210 to terminate the D2D link 130 if an Ack is received and no more data remains to be sent on the D2D link 130. For example, if all of the data was successfully received and no more data remains to be sent on the D2D link 130, then operation may end 212.

Figure 3:
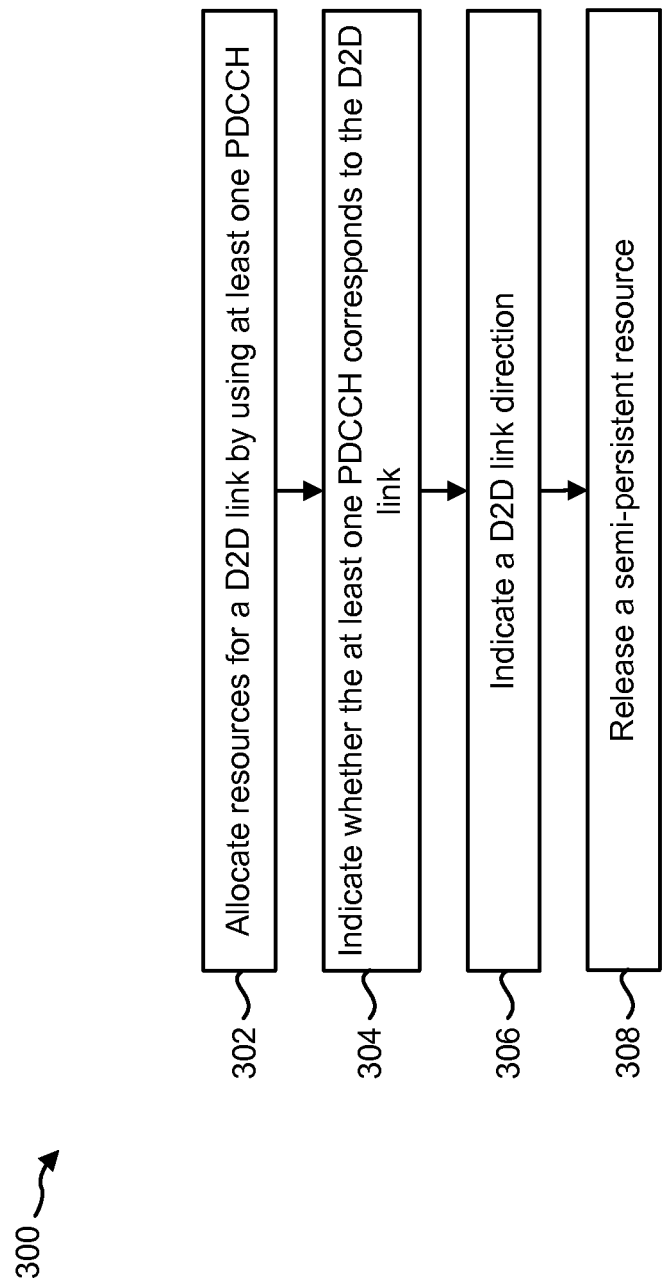
FIG. 3 is a flow diagram illustrating another configuration of a method for allocating resources for a D2D link.

FIG. 3 is a flow diagram illustrating another configuration of a method 300 for allocating resources for a D2D link. An eNB 102 may allocate 302 resources for a D2D link 130 by using at least one PDCCH. In other words, a message for resource allocation may be carried in at least one PDCCH. For example, the eNB 102 may send at least one PDCCH to one or more UEs 118s that activates a semi-persistent resource. Alternatively, the eNB 102 may allocate 302 a semi-persistent resource by sending RRC signaling to one or more UEs 118. The resources allocated 302 may correspond to a PUSCH.

In a first approach for allocating 302 resources, the eNB 102 may send one PDCCH per UE 118. For example, each PDCCH is separately coded for each UE 118. In a second approach for allocating 302 resources, the eNB 102 may send one PDCCH for all UEs 118 (per D2D transmission, for example). For instance, control information (in the PDCCH) for transmitting UEs and control information (in the PDCCH) for receiving UEs is jointly coded. In a third approach for allocating 302 resources, the eNB 102 may send two PDCCHs (per D2D transmission, for example). One of the PDCCHs corresponds to one or more transmitting UEs and the other PDCCH corresponds to one or more receiving UEs. For example, control information (in the PDCCH) for transmitting UEs and control information (in the PDCCH) for receiving UEs is separately coded. More detail regarding these approaches for resource allocation is given below.

The eNB 102 may indicate 304 whether the at least one PDCCH corresponds to the D2D link 130. For example, the eNB 102 may provide an indication regarding whether a PDCCH corresponds to a D2D link 130 as opposed to a normal link 116. In some configurations, the eNB 102 may indicate 304 this based on a DCI format. In other configurations, the eNB 102 may indicate 304 this based on one or more RNTIs (e.g., scrambling CRC of DCI based on one or more RNTIs). More detail on indicating 304 whether a PDCCH corresponds to a normal link 116 or a D2D link 130 is given below.

The eNB 102 may indicate 306 a D2D link direction. For example, the eNB 102 may use one or more approaches that indicate which UE 118 is a transmitting UE and which UE 118 is a receiving UE. In some configurations, the eNB 102 may indicate 306 a D2D link direction based on one or more RNTIs. In other configurations, the eNB 102 may indicate 306 a D2D link direction based on a DCI (e.g., one or more identification bits in a payload field of a DCI). In yet other configurations, the eNB 102 may indicate 306 a D2D link direction based on RRC signaling. More detail on indicating 306 a D2D link direction is given above and below.

In some configurations, the eNB 102 may release 308 a semi-persistent resource. For example, once the eNB 102 has allocated 302 resources, indicated 304 that a PDCCH corresponds to the D2D link and indicated 306 a D2D link direction, a transmitting UE (e.g., UE A 118a) and a receiving UE (e.g., UE B 118b) may communicate on the D2D link 130 until the eNB 102 releases 308 a semi-persistent resource. In some configurations, the eNB 102 may release 308 a semi-persistent resource by sending at least one PDCCH to one or more UEs 118 that deactivates the semi-persistent resource. In other configurations, the eNB 102 may release 308 a semi-persistent resource by sending RRC signaling to one or more UEs 118 that releases the semi-persistent resource.

Figure 4:
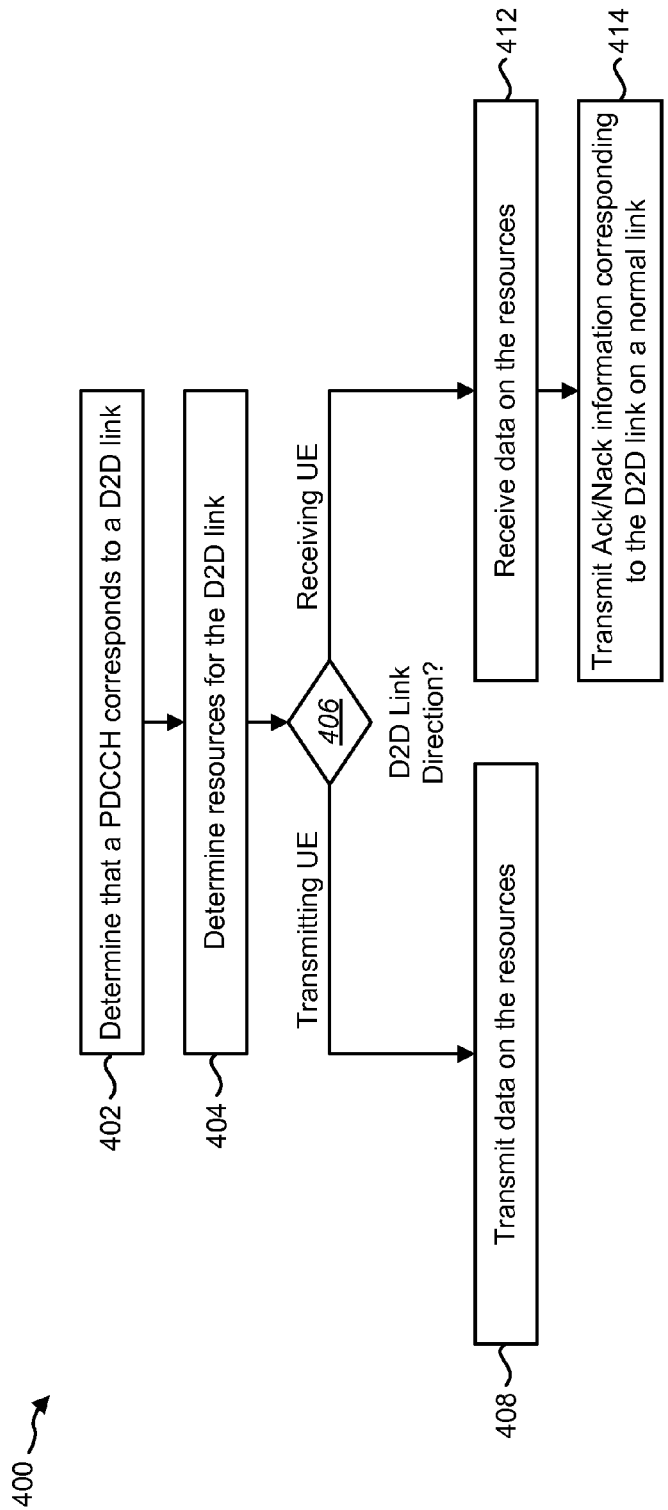
FIG. 4 is a flow diagram illustrating some configurations of a method for determining resources for a D2D link.

FIG. 4 is a flow diagram illustrating some configurations of a method 400 for determining resources for a D2D link. A UE 118 may determine 402 that a PDCCH corresponds to a D2D link. For example, the UE 118 may receive a PDCCH and determine 402 that the PDCCH corresponds to a D2D link 130. More specifically, for instance, the method 400 illustrated in FIG. 4 may be performed by a UE 118 when the UE 118 determines 402 that a PDCCH corresponds to a D2D link 130 as opposed to a normal link 116. In some configurations, the UE 118 may make this determination 402 based on a DCI format. In other configurations, the UE 118 may make this determination 402 based on one or more RNTIs. More detail on determining 402 that a PDCCH corresponds to a normal link 116 or a D2D link 130 is given below.

The UE 118 may determine 404 resources for the D2D link. For example, the UE 118 may determine 404 time and frequency resources that are allocated for a D2D transmission.

In a first approach for determining 404 resources, the UE 118 may receive and decode a PDCCH that is specific to the UE 118. For example, each PDCCH is separately coded for each UE 118. In a second approach for determining 404 resources, the UE 118 may receive and decode a PDCCH that is for all UEs 118 (per D2D transmission, for example). For instance, control information for transmitting UEs and control information for receiving UEs may be included in the same PDCCH. In a third approach for determining 404 resources, the UE 118 may receive and decode a PDCCH that is particular to receiving or transmitting UEs. In one case, for instance, the received PDCCH corresponds to one or more transmitting UEs. In another case, the received PDCCH corresponds to one or more receiving UEs. For example, control information in the PDCCH may only correspond to a transmitting UE or a receiving UE. More detail regarding these approaches for determining 404 resources is given below.

The UE 118 may determine 406 a D2D link direction. For example, the UE 118 may determine 406 whether the UE 118 is a transmitting UE or a receiving UE. In some configurations, the UE 118 may determine 406 a D2D link direction based on one or more RNTIs. In other configurations, the UE 118 may determine 406 a D2D link direction based on a DCI (e.g., one or more identification bits in a payload field of a DCI). In yet other configurations, the UE 118 may determine 406 a D2D link direction based on RRC signaling. More detail on determining 406 a D2D link direction is given above.

If the UE 118 is transmitting UE, then the UE 118 may transmit 408 data on the resources. For example, the UE 118 may transmit 408 data on the time and frequency resources determined 404 for the D2D link 130. In some configurations, the UE 118 may continue transmitting 408 data on the D2D link 130 until the eNB 102 releases a semi-persistent resource.

The UE 118 may optionally receive Ack/Nack information corresponding to the D2D link 130 on a normal link 116. In some configurations, the UE 118 may retransmit data corresponding to a Nack on the D2D link 130, if any Nacks are received. Alternatively, a retransmission may be based on determining 404 resources for the D2D link 130. For example, the UE 118 may retransmit prior transmitted data if a PDCCH (for resource allocation) indicates a retransmission as described above.

If the UE 118 is a receiving UE, then the UE 118 may receive 412 data on the resources. For example, the UE 118 may receive 412 data on the time and frequency resources determined 404 for the D2D link 130. In some configurations, the UE 118 may continue receiving 412 data on the D2D link 130 until the eNB 102 releases a semi-persistent resource.

The UE 118 may optionally transmit 414 Ack/Nack information corresponding to the D2D link 130 on a normal link 116. For example, the UE 118 may transmit the Ack/Nack information to the eNB 102 on a PUCCH, ePUCCH, PUSCH or ePUSCH. In some configurations, the UE 118 may receive retransmitted data corresponding to a Nack on the D2D link 130, if any Nacks are transmitted. Receiving a retransmission may be based on further determining 404 resources for the D2D link 130.

Figure 5:
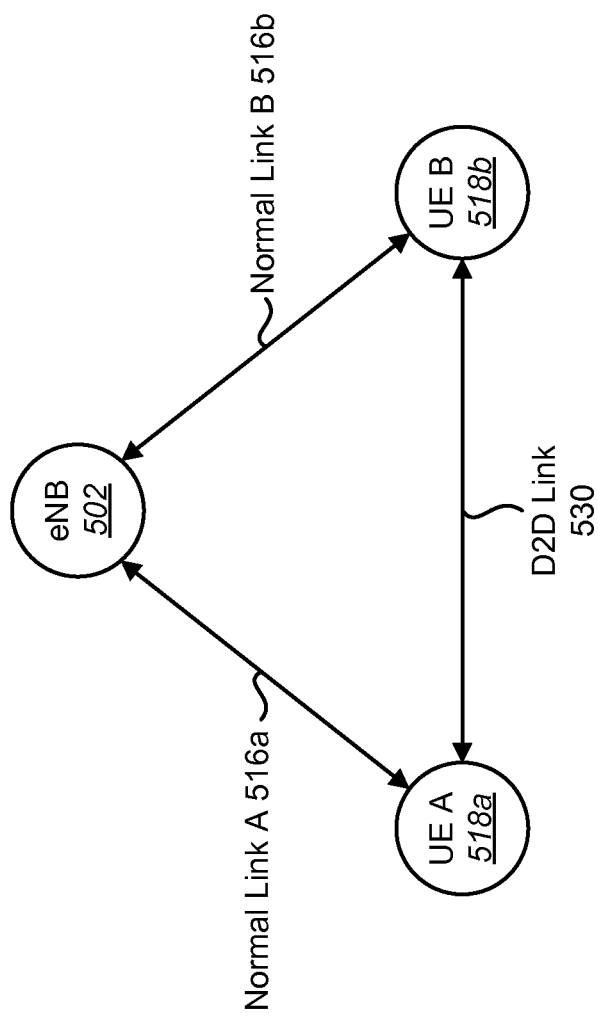
FIG. 5 is a diagram illustrating one example of a D2D link.

FIG. 5 is a diagram illustrating one example of a D2D link 530. In particular, FIG. 5 provides more detail regarding a D2D link and band allocation as follows. D2D communication (which may also be referred to as peer-to-peer, proximity services, etc.), as an additional service to E-UTRAN or 3GPP-LTE-Advanced, provides a direct link between two or more UEs 518a-b. D2D communication enables the UEs 518a-b to exchange data without passing the data traffic through the E-UTRAN core network and infrastructure, such as an eNB 502. A UE 518 that is capable of making a D2D link 530 may link to the eNB 502 and to other UE(s) 518 with D2D capabilities. Normal links 516 and D2D links 530 are possible communication links that may exist concurrently in an E-UTRAN or LTE-Advanced system with D2D communication service. As used herein, the term "concurrent" and variations thereof may indicate that at least two events may overlap each other in time. However, the term "concurrent" and variations thereof may or may not indicate that two or more events begin and/or end at precisely the same time.

FIG. 5 particularly illustrates one example of possible communication links (e.g., normal link A 516a, normal link B 516b and a D2D link 530) that UEs 518a-b with D2D communication capabilities can make. It should be noted that two UEs 518a-b (e.g., UE A 518a and UE B 518b) may or may not be linked to the same eNB 502. Moreover, a link to the eNB 502 may be provided through a relay or receiving points implemented by remote radio heads, for example.

Figure 6:
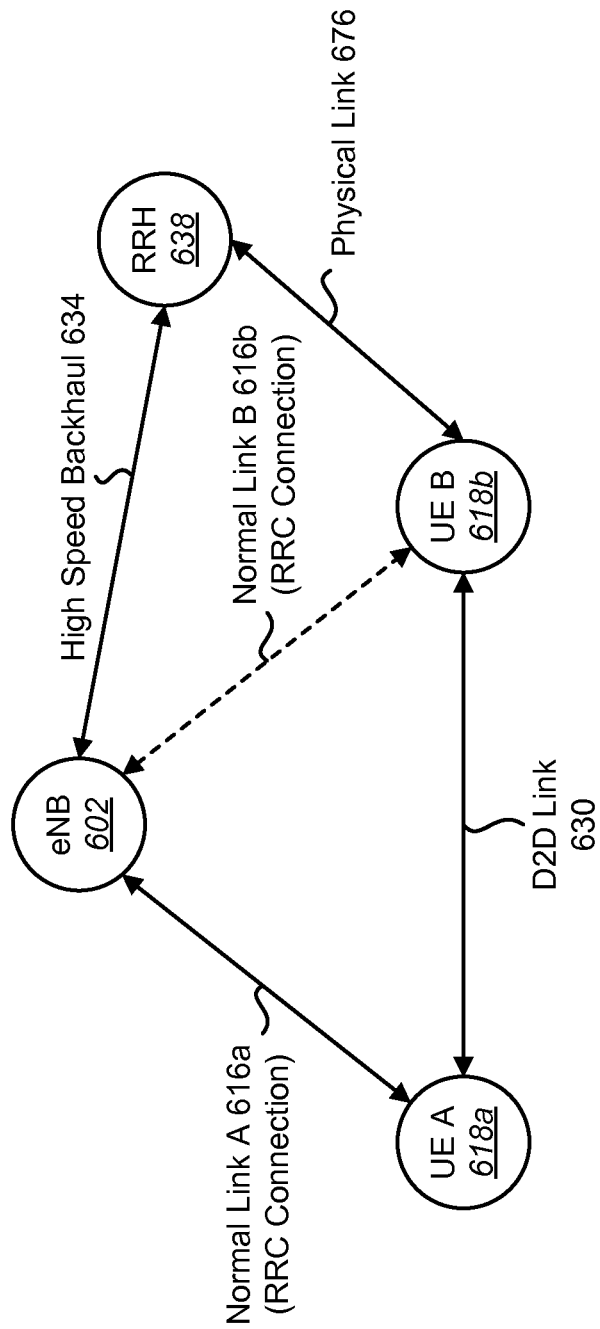
FIG. 6 is a diagram illustrating another example of a D2D link.

FIG. 6 is a diagram illustrating another example of a D2D link 630. In particular, FIG. 6 illustrates an eNB 602, a remote radio head (RRH) 638, UE A 618a and UE B 618b. The eNB 602 and the RRH 638 may be included within an E-UTRAN. In this example, the eNB 602 communicates with UE A 618a via normal link A 616a (e.g., an RRC connection). Additionally, the eNB 602 communicates with UE B 618b over a high speed backhaul 634, the RRH 638 and a physical link 676. The high speed backhaul 634 and the physical link 676 via the RRH 638 may constitute logical normal link B 616b (e.g., an RRC connection) between the eNB 602 and UE B 618b. The eNB 602 may apply the systems and methods disclosed herein for allocating resources for the D2D link 630 between UE A 618a and UE B 618b. Additionally, one or more of UE A 618a and UE B 618b may apply the systems and methods disclosed herein for determining resources for the D2D link 630.

Figure 7:
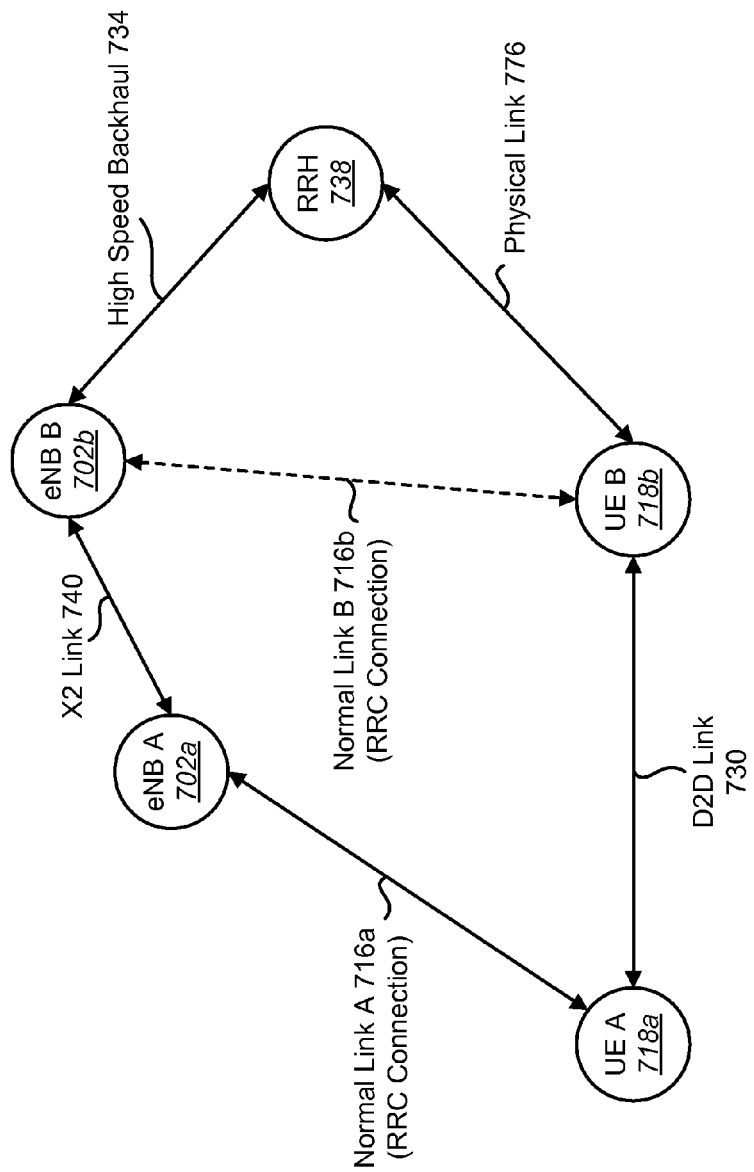
FIG. 7 is a diagram illustrating another example of a D2D link.

FIG. 7 is a diagram illustrating another example of a D2D link 730. For instance, FIG. 7 illustrates an E-UTRAN with D2D service in which two UEs 718a-b with a D2D link 730 are connected to two different eNBs 702a-b. In particular, FIG. 7 illustrates eNB A 702a, eNB B 702b, a remote radio head (RRH) 738, UE A 718a and UE B 718b. eNB A 702a, eNB B 702b and the RRH 738 may be included within an E-UTRAN.

In this example, the eNB 702 communicates with UE A 718a via normal link A 716a (e.g., an RRC connection). eNB A 702a communicates with eNB B 702b over an X2 link 740. Additionally, eNB B 702b communicates with UE B 718b over a high speed backhaul 734, the RRH 738 and a physical link 776. The high speed backhaul 734 and the physical link 776 via the RRH 738 may constitute logical normal link B 716b (e.g., an RRC connection) between eNB B 702b and UE B 718b. The eNBs 702a-b may apply (and/or cooperate to apply) the systems and methods disclosed herein for allocating resources for the D2D link 730 between UE A 718a and UE B 718b. For instance, eNB B 702b may perform one or more of allocating resources for the D2D link 730 via eNB A 702a, indicating a D2D link direction via eNB A 702a, releasing a semi-persistent resource via eNB A 702a and forwarding received Ack/Nack information via eNB A 702a. Additionally, one or more of UE A 718a and UE B 718b may apply the systems and methods disclosed herein for determining resources for the D2D link 730.

The dashed line illustrated in FIG. 7 between UE B 718b and eNB B 702b indicates logical normal link B 716b (e.g., an RRC connection) that connects UE B 718b to the core network (e.g., E-UTRAN). Furthermore, the physical link 776 between UE B 718b and the RRH 738 facilitate such a connection. It should be noted that the physical link 776 (or the physical link 676 illustrated in FIG. 6) may not require any operation that is standardized by 3GPP LTE-Advanced and later releases.

In some configurations, in order to establish a D2D link 130 to or from a UE 118, the UE 118 must be RRC connected to the E-UTRAN core network and must be in active mode. Therefore, if a UE 118 is in an idle mode and is set to be a source (where data traffic is generated, for example), or set to be a sink (where data traffic is received, for example) by a base station (e.g., eNB 102, access point or a centralized scheduler), then the UE 118 may be switched to active mode through a current or existing paging or initial access procedure in the art.

Figure 8:
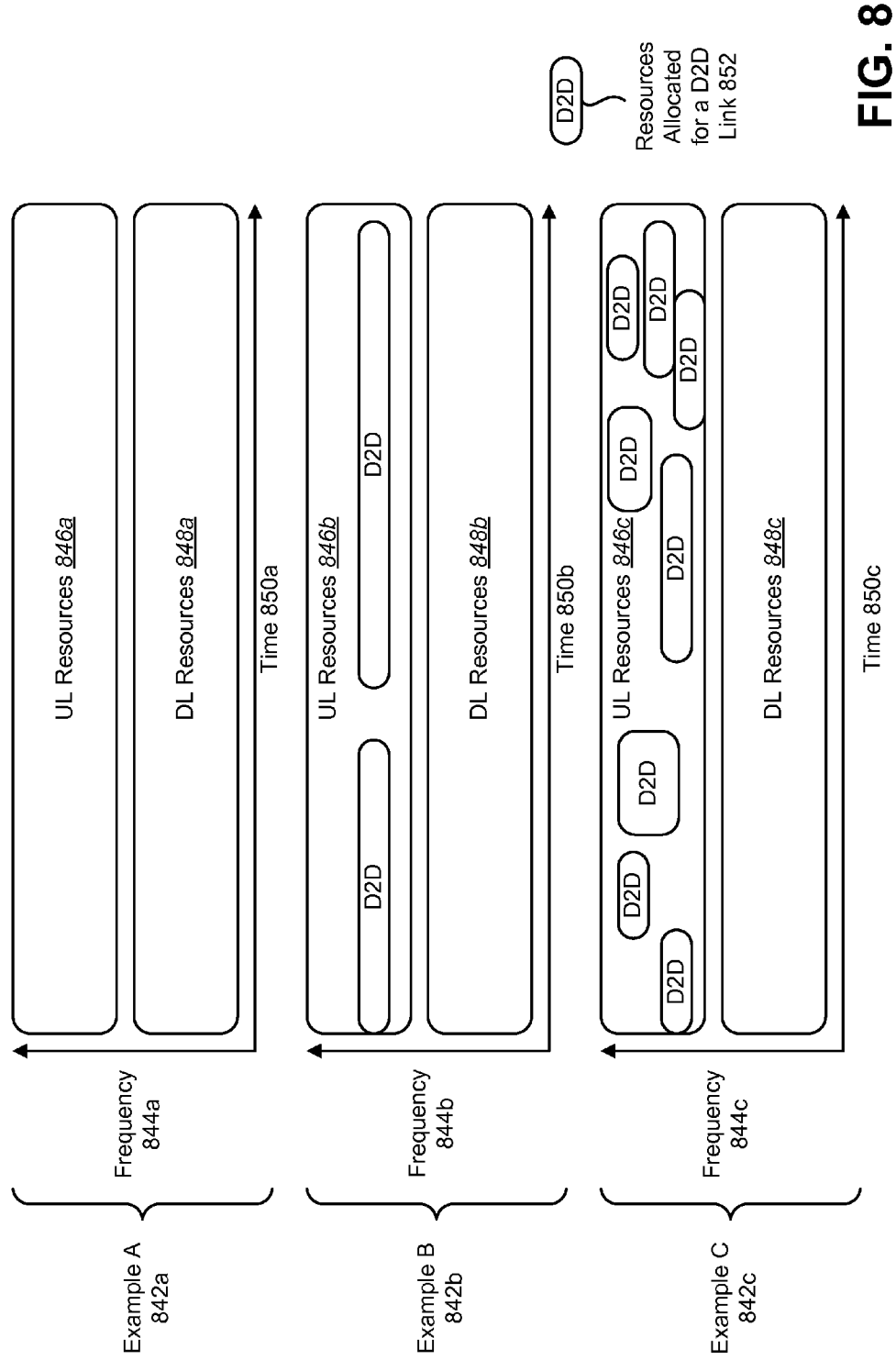
FIG. 8 is a diagram illustrating some examples of resources that may be allocated for a D2D link in a Frequency Division Duplexing (FDD) configuration.
Figure 9:
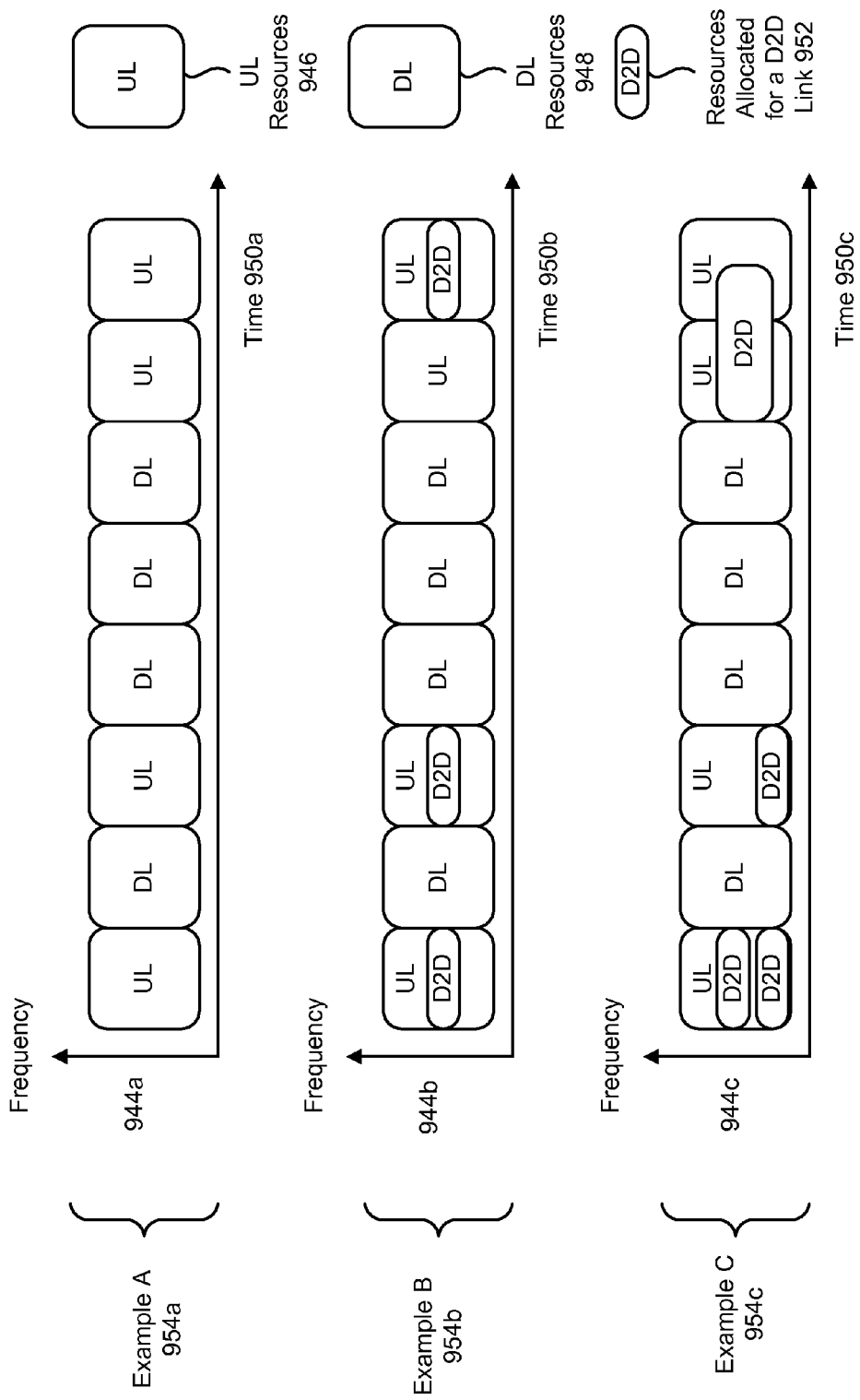
FIG. 9 is a diagram illustrating some examples of resources that may be allocated for a D2D link in a Time Division Duplexing (TDD) configuration.

Further detail regarding band allocation in accordance with the systems and methods disclosed herein is given as follows. The frequency spectrum used for communication is divided into bands. Therefore, each frequency band is a contiguous interval of spectrum. For cellular communication purposes, there may be one or several carriers within each frequency band. For example, each carrier in the E-UTRAN may have a bandwidth of 1.5, 3, 5, 10, or 20 megahertz (MHz). Each carrier in the E-UTRAN is divided into subcarriers. The dedicated resource allocation for a D2D link may be implemented by allocating a carrier that can be used only for D2D communication. FIGS. 8 and 9 provide examples in which the D2D link does not have a dedicated carrier and shares time and frequency resources with existing E-UTRAN cellular services.

There are two approaches for allocating time and frequency resources for a D2D link. In a first approach, time and frequency resources may be allocated by dedicating a carrier, extension carriers or subcarriers for the D2D link. In a second approach, time and frequency resources may be allocated from shared time and frequency resources with other E-UTRAN services. Furthermore, there are two approaches for allocating shared time and frequency resources. For example, shared time and frequency resources may be allocated by dynamic allocation or semi-persistent allocation. In dynamic allocation, the time and frequency resource allocation may change from subframe to subframe. In semi-persistent resource allocation, the resources are allocated for the D2D link for a certain period of time. The period for which the resources are semi-persistently allocated may be configured by an eNB. In semi-persistent allocation, the resources may be allocated or activated by sending RRC signaling or by sending one or more PDCCHs. However, dynamic resource allocation may only be performed by sending one or more PDCCHs.

FIG. 8 is a diagram illustrating some examples 842 of resources that may be allocated for a D2D link in a FDD configuration. An E-UTRAN (including an eNB, for example) may utilize dedicated time and frequency resources reserved specifically for a D2D transmission or may allocate some time and frequency resources that are also shared by E-UTRAN or LTE-Advanced (as specified by 3GPP Release 11 standards and beyond, for example) for transmission of D2D traffic. For example, resources within a licensed band may be allocated for a D2D link in some configurations. A D2D communication band may use all or a subset of the uplink spectrum in an FDD configuration as illustrated in FIG. 8.

In particular, FIG. 8 illustrates three examples 842*a-c*. Example A 842*a* illustrates uplink (UL) resources 846*a* and downlink (DL) resources 848*a* over frequency 844*a* and time 850*a* in an FDD configuration. For instance, frequency 844*a* spectrum may be allocated for UL and DL communications in an FDD configuration as illustrated by example A 842*a*. In some configurations, example A 842*a* may show an FDD E-UTRAN. In particular, example A 842*a* may represent available time and frequency resources in one carrier of the E-UTRAN.

Example B 842*b* illustrates resources allocated for a D2D link 852 from UL resources 846*b* over frequency 844*b* and time 850*b*. DL resources 848*b* are also shown in example B 842*b* over frequency 844*b* and time 850*b*. In particular, example B 842*b* illustrates a resource allocation for UL and DL communications in an FDD configuration with dedicated time and frequency resource allocation for D2D communication services sharing the UL frequencies. In some configurations, example B 842*b* may show an FDD E-UTRAN with dedicated D2D resource allocation. Example B 842*b* illustrates one instance of semi-persistent resource allocation for a D2D link.

Example C 842*c* illustrates resources allocated for a D2D link 852 from UL resources 846*c* over frequency 844*c* and time 850*c*. DL resources 848*c* are also shown in example C 842*c* over frequency 844*c* and time 850*c*. In particular, example C 842*c* illustrates resource allocation for UL and DL communications in an FDD configuration with dynamic time and frequency allocation for D2D communication services sharing the UL frequencies. In some configurations, example C 842*c* may show an FDD E-UTRAN with dynamic D2D resource allocation.

FIG. 9 is a diagram illustrating some examples 954 of resources that may be allocated for a D2D link in a TDD configuration. An E-UTRAN (including an eNB, for example) may utilize a dedicated band reserved specifically for a D2D transmission or may allocate some bandwidth that is also shared by E-UTRAN or LTE-Advanced (as specified by 3GPP Release 11 standards and beyond, for example) for transmission of D2D traffic. In a TDD configuration, D2D communications may be scheduled in an uplink or special subframe and may use all or part of the spectrum as illustrated in FIG. 9.

In particular, FIG. 9 illustrates three examples 954*a-c*. Example A 954*a* illustrates UL resources 946 and DL resources 948 over frequency 944*a* and time 950*a* in a TDD configuration. For instance, time 950*a* and frequency 944*a* resources may be allocated for UL and DL communications in a TDD configuration as illustrated by example A 954*a*. In some configurations, example A 954*a* may show a TDD E-UTRAN.

Example B 954*b* illustrates resources allocated for a D2D link 952 from UL resources 946 over frequency 944*b* and time 950*b*. DL resources 948 are also shown in example B 954*b* over frequency 944*b* and time 950*b*. In particular, example B 954*b* illustrates a time and frequency allocation for UL and DL communications in a TDD configuration with a dedicated resource allocation for D2D communication services sharing the UL resources 946. In some configurations, example B 954*b* may show a TDD E-UTRAN with dedicated or semi-persistent D2D time and frequency allocation.

Example C 954*c* illustrates resources allocated for a D2D link 952 from UL resources 946 over frequency 944*c* and time 950*c*. DL resources 948 are also shown in example C 954*c* over frequency 944*c* and time 950*c*. In particular, example C 954*c* illustrates a time and frequency allocation for UL and DL communications in a TDD configuration with a dynamic resource allocation for D2D communication services sharing the UL resources 946. In some configurations, example C 954*c* may show a TDD E-UTRAN with dynamic D2D resource allocation.

Figure 10:
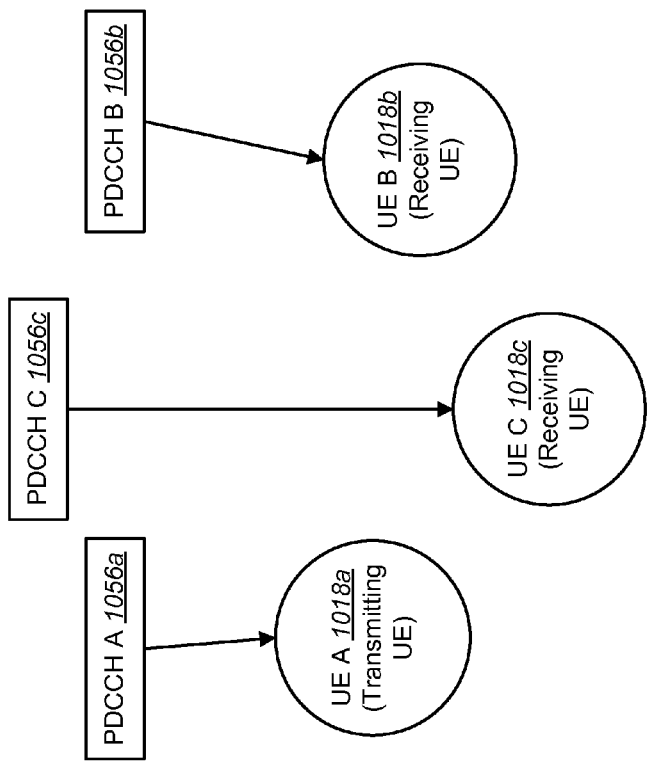
FIG. 10 is a diagram illustrating one example of a first approach for resource allocation in accordance with the systems and methods disclosed herein.
Figure 11:
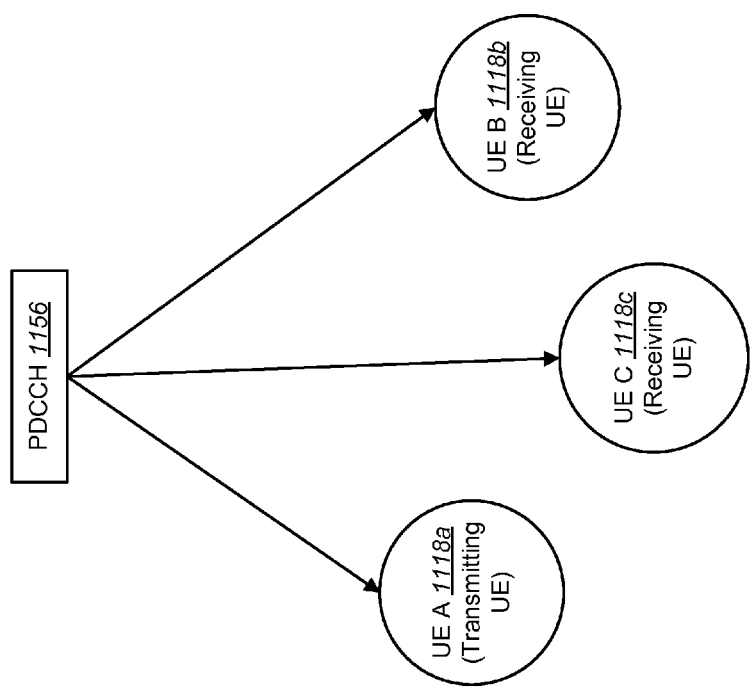
FIG. 11 is a diagram illustrating one example of a second approach for resource allocation in accordance with the systems and methods disclosed herein.
Figure 12:
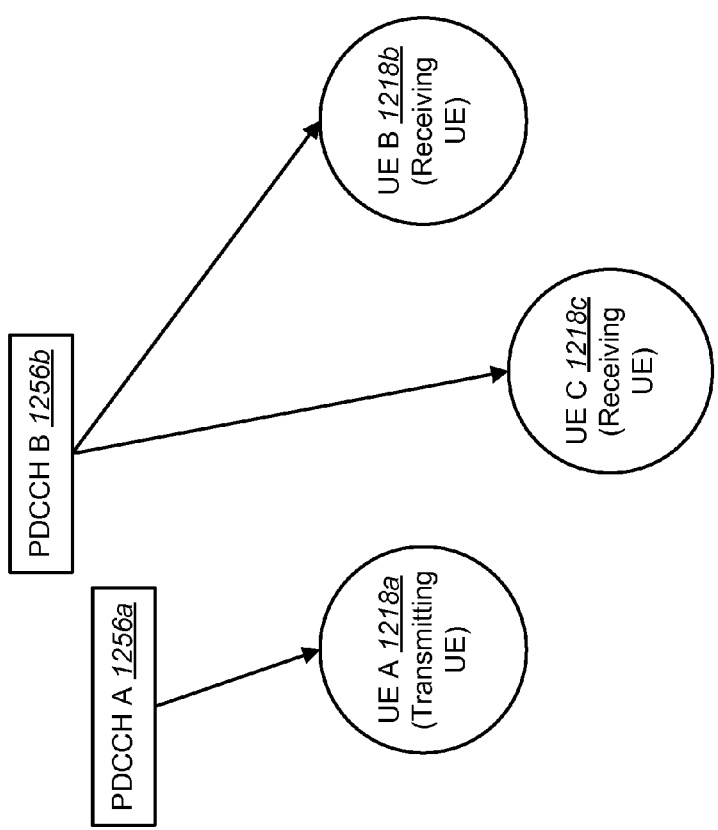
FIG. 12 is a diagram illustrating one example of a third approach for resource allocation in accordance with the systems and methods disclosed herein.

More detail regarding D2D resource allocation and determination is given in connection with FIGS. 10-12. In particular, FIGS. 10-12 illustrate alternative approaches for transmission and reception of one or more PDCCHs for scheduling the UEs for a D2D link as follows.

FIG. 10 is a diagram illustrating one example of a first approach for resource allocation in accordance with the systems and methods disclosed herein. FIG. 10 illustrates one example of a first approach for resource allocation. In the first approach, the base station or eNB transmits one (separate) PDCCH for scheduling each UE for a D2D link. For example, regardless of whether a UE 1018 is a transmitting UE or a receiving UE, each UE 1018*a-c* monitors its corresponding PDCCH 1056*a-c* and the eNB sends a separate PDCCH 1056*a-c* for each UE. That is, each PDCCH 1056*a-c* is separately coded for each UE 1018*a-c*. The benefit of separating the PDCCH 1056*a-c* (or ePDCCH) of each UE 1018*a-c* is that content for each UE 1018*a-c* may be improved (e.g., optimized) and PDCCH 1056*a-c* quality may be improved (e.g., optimized) for each UE 1018*a-c* by link adaptation.

FIG. 11 is a diagram illustrating one example of a second approach for resource allocation in accordance with the systems and methods disclosed herein. In a second approach for resource allocation, the base station or eNB transmits only one PDCCH for scheduling all UEs for a D2D link. For example, regardless of whether a UE 1118*a-c* is a transmitting UE or a receiving UE, each UE 1118*a-c* monitors one PDCCH 1156 and the eNB sends one PDCCH 1156 for all UEs 1118*a-c*. That is, the PDCCH 1156 is jointly coded for all UEs 1118*a-c* involved in D2D communication. The benefit of one PDCCH 1156 (or ePDCCH) for all UEs 1118*a-c* is that PDCCH overhead may be reduced (e.g., minimized) and multicasting may be enabled in which one transmitting UE sends information to multiple receiving UEs concurrently.

FIG. 12 is a diagram illustrating one example of a third approach for resource allocation in accordance with the systems and methods disclosed herein. In a third approach for resource allocation, a base station or eNB transmits two PDCCHs (e.g., two DCIs) for scheduling a D2D link. For example, One PDCCH (or ePDCCH) or DCI (e.g., PDCCH A 1256*a*) indicates a transmitting UE (e.g., UE A 1218*a*) or a group of transmitting UEs (a group of transmitting UEs for cooperative transmission). Another PDCCH (or ePDCCH) or DCI (e.g., PDCCH B 1256*b*) indicates the receiving UE or a group of receiving UEs (e.g., UE B 1218*b* and UE C 1218*c*). The group of receiving UEs may be a group of receiving UEs for multicasting, for example. The benefit of separating the PDCCH (or ePDCCH) for transmitting UEs and receiving UEs is that content may be improved (e.g., optimized) for transmitting UEs and receiving UEs and multicasting may be enabled in which one transmitting UE sends information to multiple receiving UEs concurrently.

Figure 13:
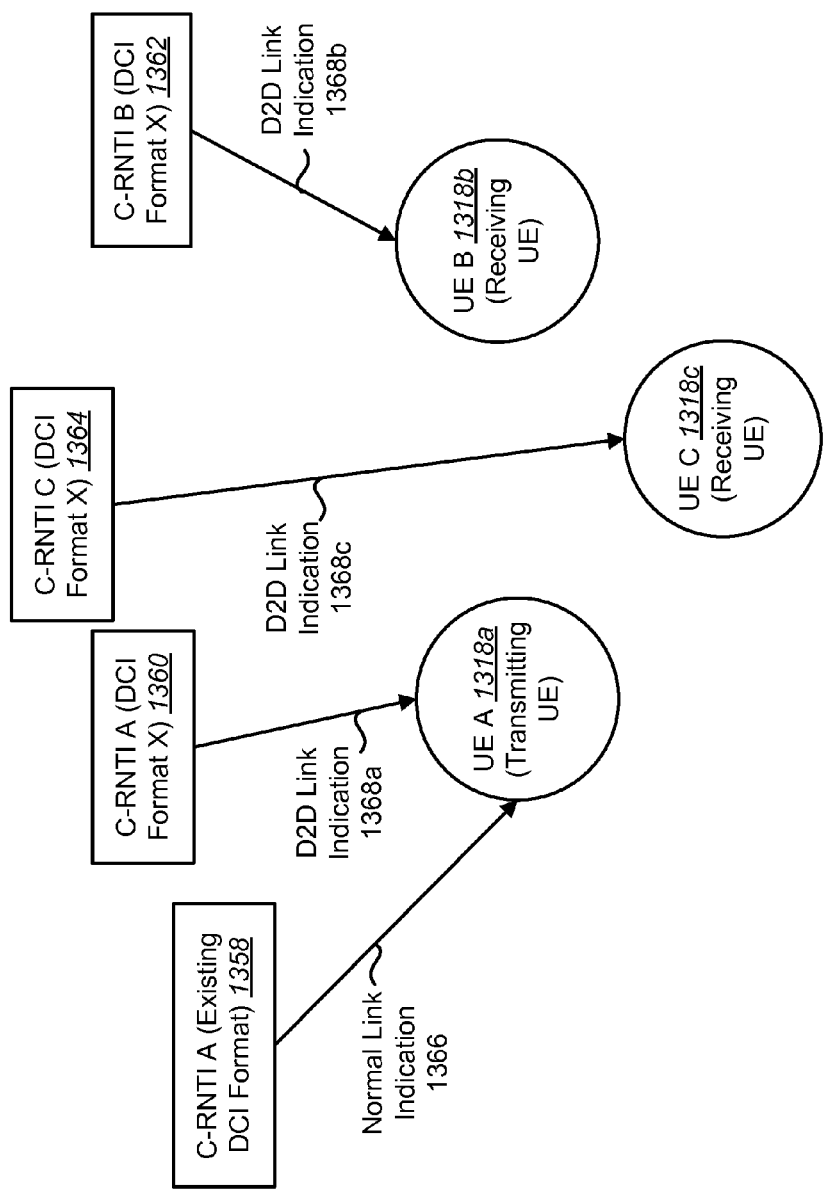
FIG. 13 is a diagram illustrating one example of a first approach for indicating and determining a Physical Downlink Control Channel (PDCCH) correspondence based on a Downlink Control Information (DCI) format in accordance with the systems and methods disclosed herein.
Figure 14:
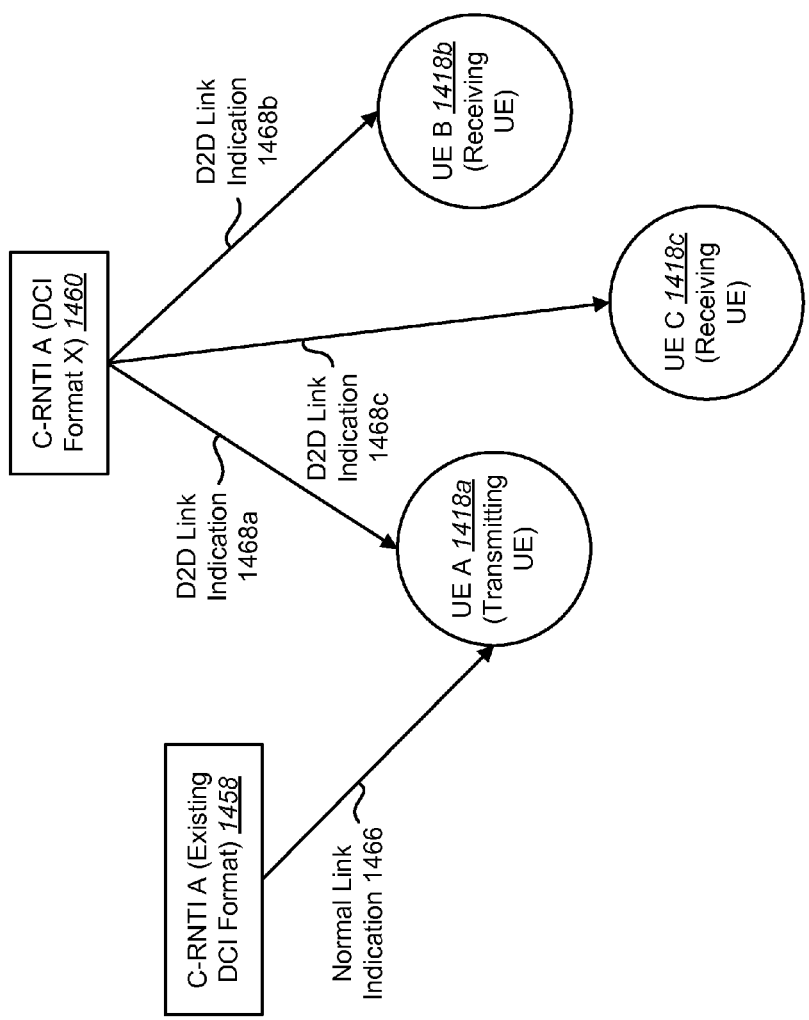
FIG. 14 is a diagram illustrating one example of a second approach for indicating and determining a PDCCH correspondence based on a DCI format in accordance with the systems and methods disclosed herein.
Figure 15:
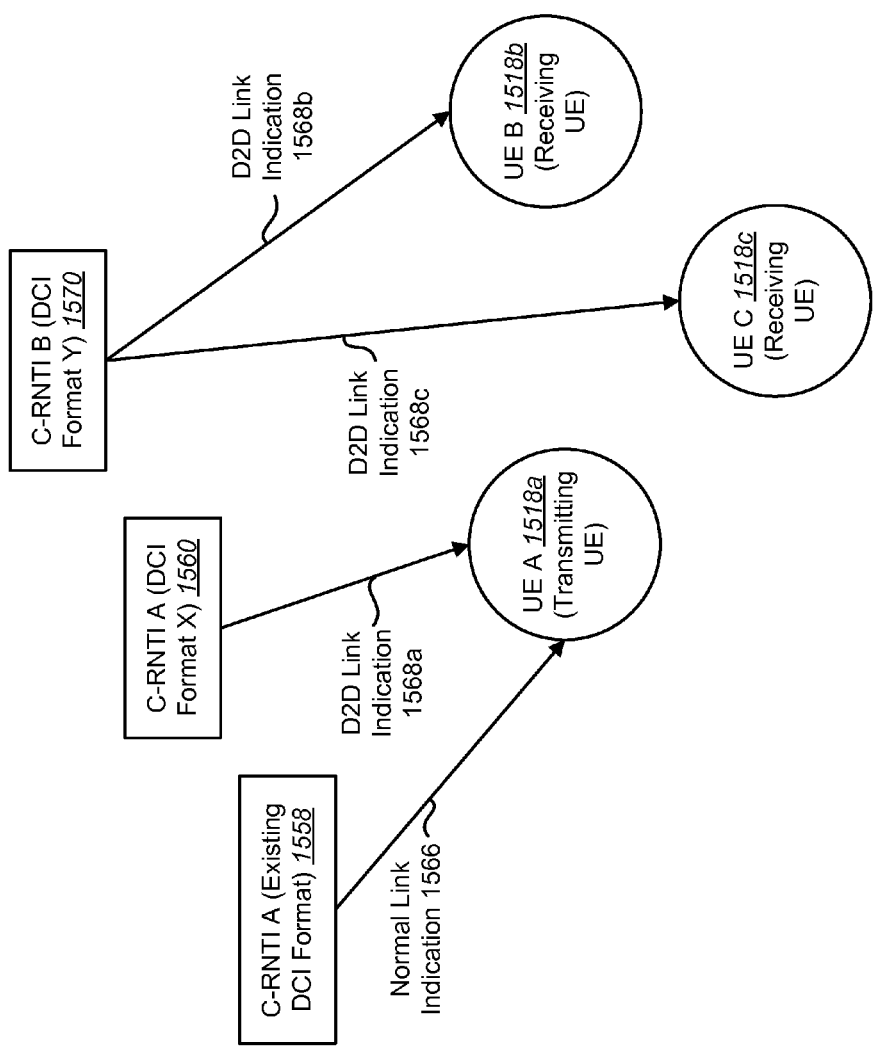
FIG. 15 is a diagram illustrating one example of a third approach for indicating and determining a PDCCH correspondence based on a DCI format in accordance with the systems and methods disclosed herein.

More detail regarding indication and determination of PDCCH correspondence to a D2D link (as opposed to correspondence to a normal link (e.g., a normal E-UTRAN link)) based on DCI format is given in connection with FIGS. 13-15. In particular, FIGS. 13-15 illustrate alternative approaches for indication and determination of PDCCH correspondence to a D2D link that respectively correspond to the first, second and third approaches for resource allocation described in connection with FIGS. 10-12.

FIG. 13 is a diagram illustrating one example of a first approach for indicating and determining a PDCCH correspondence based on a DCI format in accordance with the systems and methods disclosed herein. In particular, the first approach for indicating and determining a PDCCH correspondence illustrated in FIG. 13 corresponds to the first approach for resource allocation described in connection with FIG. 10 above.

In this example, an eNB may indicate that a PDCCH corresponds to a D2D link (or to a normal link) based on a DCI format. For example, if a PDCCH corresponds to a normal link, the eNB may generate and send a PDCCH with an existing DCI format (e.g., one of DCI formats 0, 1, 1A, 1B, 1C, 1D, 2, 2A, 2B, 2C, 3, 3A and 4 in accordance with 3GPP Release 10 specifications). However, if a PDCCH corresponds to a D2D link, the eNB may generate and send a PDCCH with a new DCI format (e.g., "DCI format X"). Accordingly, each UE may monitor a PDCCH for an existing format and a new format to determine whether a PDCCH corresponds to a normal link or to a D2D link.

In the example illustrated in FIG. 13, each UE 1318*a-c* monitors an existing DCI format with C-RNTI specific to each corresponding UE 1318*a-c*, respectively. Each UE 1318*a-c* also monitors DCI format X with C-RNTI specific to each corresponding UE 1318*a-c*, respectively. For instance, UE A 1318*a* monitors an existing format with C-RNTI A 1358 (that is specific to UE A 1318*a*) and UE A 1318*a* monitors DCI format X with C-RNTI A 1360 (that is specific to UE A 1318*a*).

In this example, UE A 1318*a* receives a PDCCH from an eNB with C-RNTI A with an existing DCI format 1358, which provides a normal link indication 1366. UE A 1318*a* may determine that this PDCCH corresponds to a normal link based on the existing DCI format. UE A 1318*a* also receives a PDCCH from an eNB with C-RNTI A with a DCI format X 1360, which provides a D2D link indication 1368*a*. UE A 1318*a* may determine that this PDCCH corresponds to a D2D link based on the DCI format X.

Additionally, UE B 1318*b* receives a PDCCH from an eNB with C-RNTI B with a DCI format X 1362, which provides a D2D link indication 1368*b*. UE B 1318*b* may determine that this PDCCH corresponds to a D2D link based on the DCI format X. Furthermore, UE C 1318*c* receives a PDCCH from an eNB with C-RNTI C with a DCI format X 1364, which provides a D2D link indication 1368*c*. UE C 1318*c* may determine that this PDCCH corresponds to a D2D link based on the DCI format X.

FIG. 14 is a diagram illustrating one example of a second approach for indicating and determining a PDCCH correspondence based on a DCI format in accordance with the systems and methods disclosed herein. In particular, the second approach for indicating and determining a PDCCH correspondence illustrated in FIG. 14 corresponds to the second approach for resource allocation described in connection with FIG. 11 above.

In this example, an eNB may indicate that a PDCCH corresponds to a D2D link (or to a normal link) based on a DCI format. For example, if a PDCCH corresponds to a normal link, the eNB may generate and send a PDCCH with an existing DCI format. However, if a PDCCH corresponds to a D2D link, the eNB may generate and send a PDCCH with a new DCI format (e.g., "DCI format X"). Accordingly, each UE may monitor a PDCCH for an existing format and a new format to determine whether a PDCCH corresponds to a normal link or to a D2D link.

In the example illustrated in FIG. 14, each UE 1418*a-c* monitors an existing DCI format with C-RNTI specific to each corresponding UE 1418*a-c*. Each UE 1418*a-c* also monitors DCI format X with C-RNTI specific to UE A 1418*a* (e.g., a transmitting UE). For instance, UE A 1418*a* monitors an existing format with C-RNTI A 1458 (that is specific to UE A 1418*a*) and UE A 1418*a* monitors DCI format X with C-RNTI A 1460 (that is specific to UE A 1418*a*). Additionally, UE B 1418*b* monitors an existing format with a C-RNTI (that is specific to UE B 1418*b*) and UE B 1418*b* monitors DCI format X with C-RNTI A 1460 (that is specific to UE A 1418*a*). An eNB may utilize dedicated RRC signaling to inform each transmitting UE or each UE in a D2D link of its specific C-RNTI.

In the example illustrated in FIG. 14, each of UE A 1418*a*, UE B 1418*b* and UE C 1418*c* monitors an existing DCI format with C-RNTI (specific to each UE 1418*a-c*, respectively) and a new DCI format X with C-RNTI (specific to UE A 1418*a*). In this example, UE A 1418*a* receives a PDCCH from an eNB with C-RNTI A with an existing DCI format 1458, which provides a normal link indication 1466. UE A 1418a may determine that this PDCCH corresponds to a normal link based on the existing DCI format. UE A 1418a also receives a PDCCH from an eNB with C-RNTI A with a DCI format X 1460, which provides a D2D link indication 1468a. UE A 1418a may determine that this PDCCH corresponds to a D2D link based on the DCI format X.

Additionally, UE B 1418b receives a PDCCH from an eNB with C-RNTI A with a DCI format X 1460, which provides a D2D link indication 1468b. UE B 1418b may determine that this PDCCH corresponds to a D2D link based on the DCI format X. Furthermore, UE C 1418c receives a PDCCH from an eNB with C-RNTI A with a DCI format X 1460, which provides a D2D link indication 1468c. UE C 1418c may determine that this PDCCH corresponds to a D2D link based on the DCI format X.

FIG. 15 is a diagram illustrating one example of a third approach for indicating and determining a PDCCH correspondence based on a DCI format in accordance with the systems and methods disclosed herein. In particular, the third approach for indicating and determining a PDCCH correspondence illustrated in FIG. 15 corresponds to the third approach for resource allocation described in connection with FIG. 12 above.

In this example, an eNB may indicate that a PDCCH corresponds to a D2D link (or to a normal link) based on a DCI format. For example, if a PDCCH corresponds to a normal link, the eNB may generate and send a PDCCH with an existing DCI format. However, if a PDCCH corresponds to a D2D link, the eNB may generate and send a PDCCH with a new DCI format (e.g., "DCI format X" or "DCI format Y"). Accordingly, each UE may monitor a PDCCH for an existing format and a new format to determine whether a PDCCH corresponds to a normal link or to a D2D link.

In the example illustrated in FIG. 15, each UE 1518a-c monitors an existing DCI format with C-RNTI specific to each corresponding UE 1518a-c, respectively. UE A 1518a also monitors DCI format X with C-RNTI specific to UE A 1518a (or to a transmitting UE, for example). For instance, UE A 1518a monitors an existing format with C-RNTI A 1558 (that is specific to UE A 1518a) and UE A 1518a monitors DCI format X with C-RNTI A 1560 (that is specific to UE A 1518a (e.g., a transmitting UE)). Additionally, UE B 1518b and UE C 1518c monitor a DCI format Y with a C-RNTI B 1570 (that is specific to UE B 1518b or to a receiving UE). An eNB may utilize dedicated RRC signaling to inform each transmitting UE or each UE in a D2D link of its specific C-RNTI.

In the example illustrated in FIG. 15, each of UE A 1518a, UE B 1518b and UE C 1518c monitors an existing DCI format with C-RNTI (specific to each UE 1518a-c, respectively). UE A 1518a monitors a new DCI format X with C-RNTI (specific to a transmitting UE (e.g., UE A 1518a)). In this example, UE A 1518a receives a PDCCH from an eNB with C-RNTI A with an existing DCI format 1558, which provides a normal link indication 1566. UE A 1518a may determine that this PDCCH corresponds to a normal link based on the existing DCI format. UE A 1518a also receives a PDCCH from an eNB with C-RNTI A with a DCI format X 1560, which provides a D2D link indication 1568a. UE A 1518a may determine that this PDCCH corresponds to a D2D link based on the DCI format X.

Additionally, UE B 1518b receives a PDCCH from an eNB with C-RNTI B with a DCI format Y 1570, which provides a D2D link indication 1568b. UE B 1518b may determine that this PDCCH corresponds to a D2D link based on the DCI format Y. Furthermore, UE C 1518c receives a PDCCH from an eNB with C-RNTI B with a DCI format Y 1570, which provides a D2D link indication 1568c. UE C 1518c may determine that this PDCCH corresponds to a D2D link based on the DCI format Y.

More detail regarding the indication and determination of a PDCCH correspondence between a normal link (e.g., normal E-UTRAN link) and a D2D link based on a scrambling sequence (e.g., RNTI) is given in connection with FIGS. 16-18 below. The approaches described in connection with FIGS. 16-18 may respectively correspond to the approaches for resource allocation described in connection with FIGS. 10-12.

Figure 16:
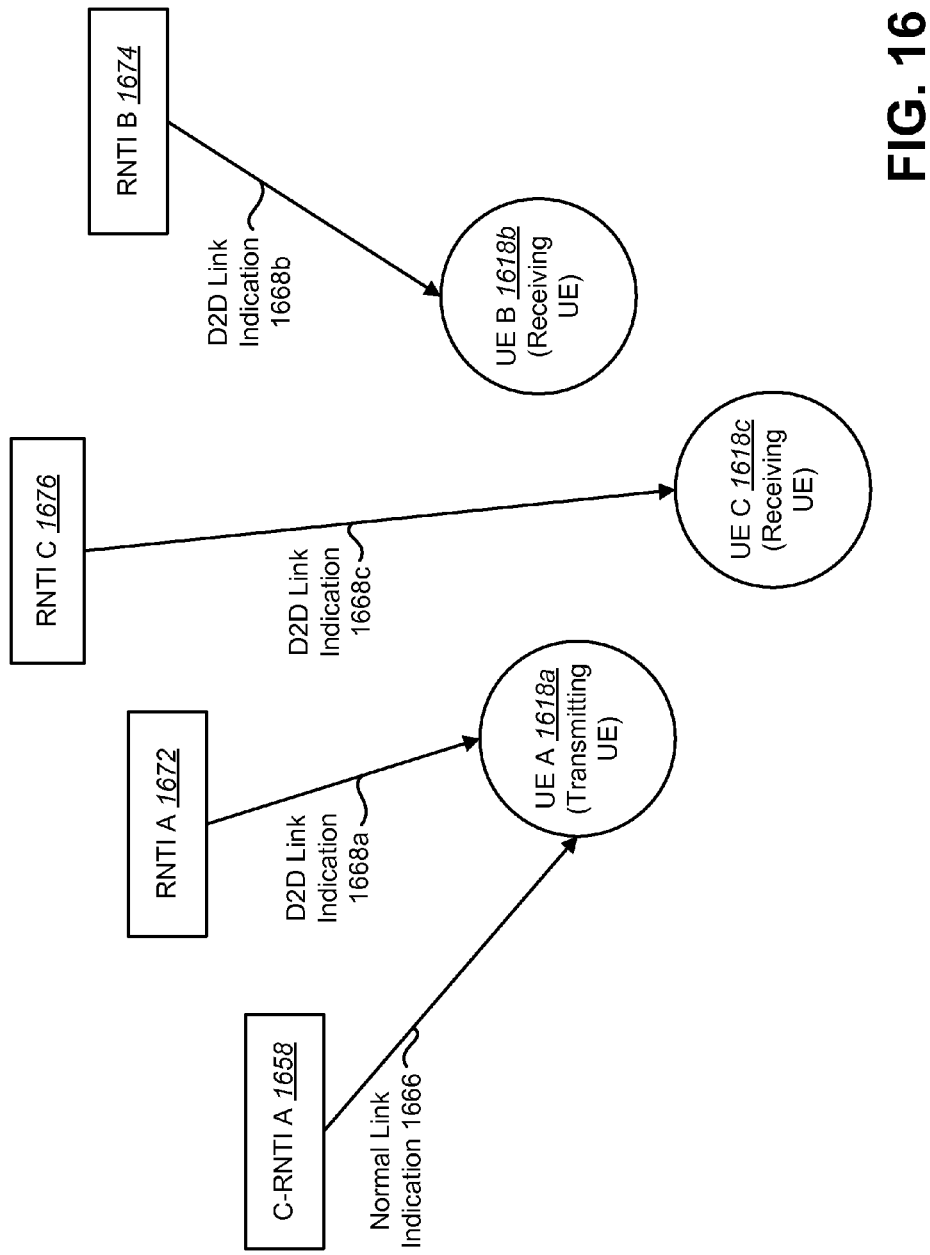
FIG. 16 is a diagram illustrating one example of a first approach for indicating and determining a PDCCH correspondence based on a Radio Network Temporary Identifier (RNTI) in accordance with the systems and methods disclosed herein.

FIG. 16 is a diagram illustrating one example of a first approach for indicating and determining a PDCCH correspondence based on a RNTI in accordance with the systems and methods disclosed herein. In particular, the first approach for indicating and determining a PDCCH correspondence illustrated in FIG. 16 corresponds to the first approach for resource allocation described in connection with FIG. 10 above.

In this example, an eNB may indicate that a PDCCH corresponds to a D2D link (or to a normal link) based on a RNTI. For example, if a PDCCH corresponds to a normal link, the eNB may generate and send a PDCCH with a particular scrambling sequence (e.g., C-RNTI). However, if a PDCCH corresponds to a D2D link, the eNB may generate and send a PDCCH with a different scrambling sequence (e.g., RNTI). Accordingly, each UE may monitor a PDCCH for a particular scrambling sequence to determine whether a PDCCH corresponds to a normal link or to a D2D link.

In the example illustrated in FIG. 16, each UE 1618a-c monitors a PDCCH with a C-RNTI specific to each corresponding UE 1618a-c, respectively. Each UE 1618a-c also monitors a PDCCH with RNTI A 1672, RNTI B 1674 and RNTI C 1676 that are specific to each corresponding UE 1618a-c, respectively. For instance, UE A 1618a monitors a PDCCH with C-RNTI A 1658 (that is specific to UE A 1618a) and UE A 1618a monitors a PDCCH with RNTI A 1672 (that is specific to UE A 1618a). An eNB may utilize dedicated RRC signaling to inform each UE 1618a-c of RNTI A 1672, RNTI B 1674 and RNTI C 1676, respectively.

In this example, UE A 1618a receives a PDCCH from an eNB with C-RNTI A 1658, which provides a normal link indication 1666. UE A 1618a may determine that this PDCCH corresponds to a normal link based on C-RNTI A 1658. UE A 1618a also receives a PDCCH from an eNB with RNTI A 1672, which provides a D2D link indication 1668a. UE A 1618a may determine that this PDCCH corresponds to a D2D link based on RNTI A 1672.

Additionally, UE B 1618b receives a PDCCH from an eNB with RNTI B 1674, which provides a D2D link indication 1668b. UE B 1618b may determine that this PDCCH corresponds to a D2D link based on RNTI B 1674. Furthermore, UE C 1618c receives a PDCCH from an eNB with RNTI C 1676, which provides a D2D link indication 1668c. UE C 1618c may determine that this PDCCH corresponds to a D2D link based on RNTI C 1676.

Figure 17:
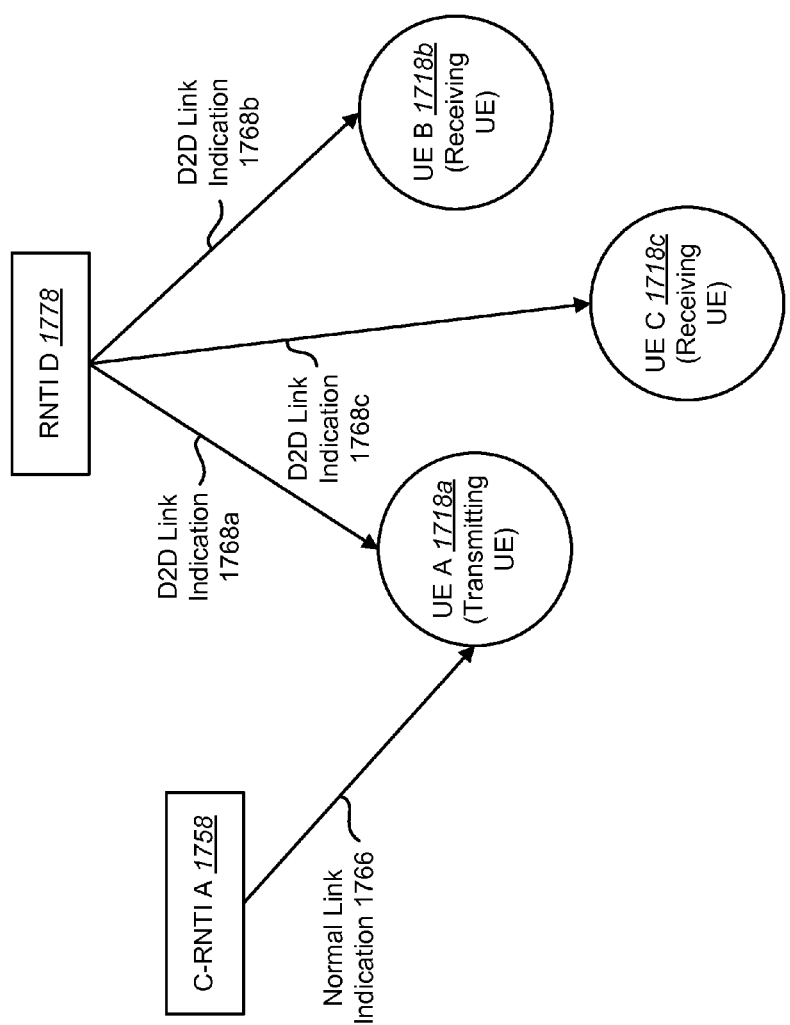
FIG. 17 is a diagram illustrating one example of a second approach for indicating and determining a PDCCH correspondence based on a RNTI in accordance with the systems and methods disclosed herein.

FIG. 17 is a diagram illustrating one example of a second approach for indicating and determining a PDCCH correspondence based on a RNTI in accordance with the systems and methods disclosed herein. In particular, the second approach for indicating and determining a PDCCH correspondence illustrated in FIG. 17 corresponds to the second approach for resource allocation described in connection with FIG. 11 above.

In this example, an eNB may indicate that a PDCCH corresponds to a D2D link (or to a normal link) based on a RNTI For example, if a PDCCH corresponds to a normal link, the eNB may generate and send a PDCCH with a particular scrambling sequence (e.g., C-RNTI). However, if a PDCCH corresponds to a D2D link, the eNB may generate and send a PDCCH with a different scrambling sequence (e.g., RNTI). Accordingly, each UE may monitor a PDCCH for a particular scrambling sequence to determine whether a PDCCH corresponds to a normal link or to a D2D link.

In the example illustrated in FIG. 17, each UE 1718*a-c* monitors an existing DCI format with C-RNTI specific to each corresponding UE 1718*a-c*. Each UE 1718*a-c* also monitors RNTI D 1778. For instance, UE A 1718*a* monitors a PDCCH with C-RNTI A 1758 (that is specific to UE A 1718*a*) and UE A 1718*a* monitors a PDCCH with RNTI D 1778. Additionally, UE B 1718*b* monitors a PDCCH with C-RNTI B (that is specific to UE B 1718*b*), for example, and UE B 1718*b* monitors a PDCCH with RNTI D 1778. An eNB may utilize dedicated RRC signaling to inform each UE of RNTI D 1778.

In the example illustrated in FIG. 17, each of UE A 1718*a*, UE B 1718*b* and UE C 1718*c* monitors a PDCCH with C-RNTI (specific to each UE 1718*a-c*, respectively) and RNTI D 1778. In this example, UE A 1718*a* receives a PDCCH from an eNB with C-RNTI A 1758, which provides a normal link indication 1766. UE A 1718*a* may determine that this PDCCH corresponds to a normal link based on the C-RNTI A 1758. UE A 1718*a* also receives a PDCCH from an eNB with RNTI D 1778, which provides a D2D link indication 1768*a*. UE A 1718*a* may determine that this PDCCH corresponds to a D2D link based on RNTI D 1778.

Additionally, UE B 1718*b* receives a PDCCH from an eNB with RNTI D 1778, which provides a D2D link indication 1768*b*. UE B 1718*b* may determine that this PDCCH corresponds to a D2D link based on RNTI D 1778. Furthermore, UE C 1718*c* receives a PDCCH from an eNB with RNTI D 1778, which provides a D2D link indication 1768*c*. UE C 1718*c* may determine that this PDCCH corresponds to a D2D link based on RNTI D 1778.

Figure 18:
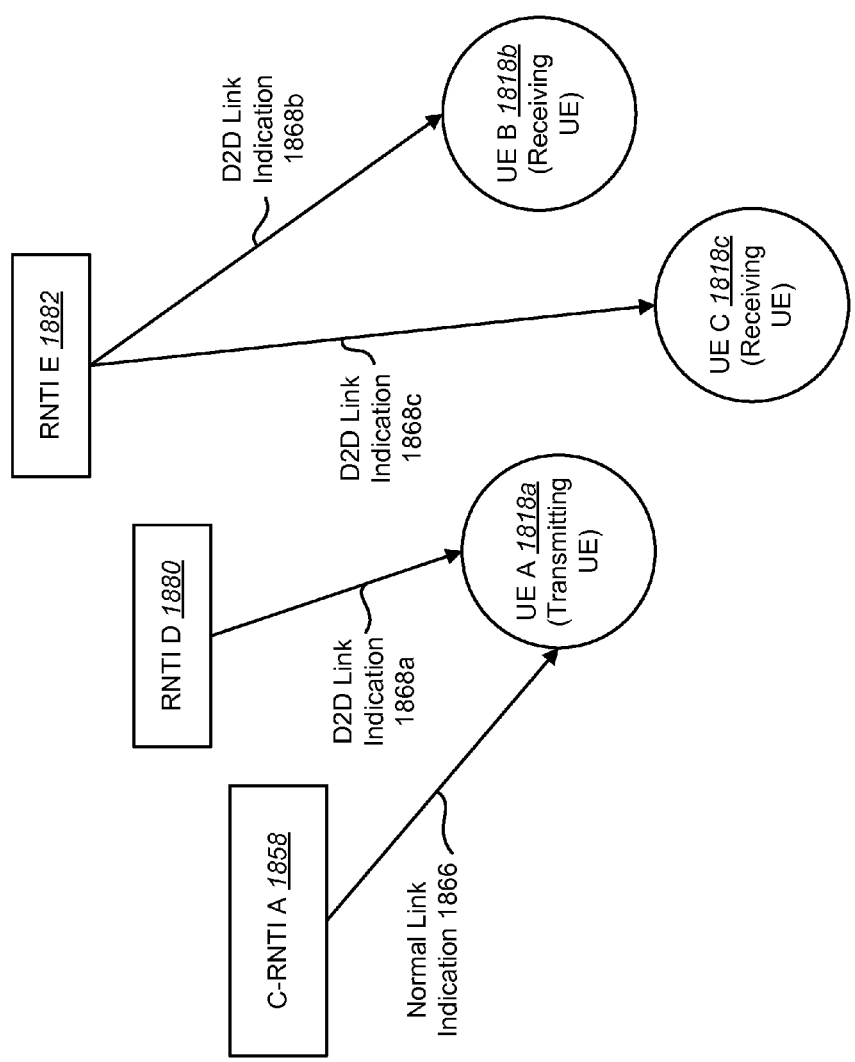
FIG. 18 is a diagram illustrating one example of a third approach for indicating and determining a PDCCH correspondence based on a RNTI in accordance with the systems and methods disclosed herein.

FIG. 18 is a diagram illustrating one example of a third approach for indicating and determining a PDCCH correspondence based on a RNTI in accordance with the systems and methods disclosed herein. In particular, the third approach for indicating and determining a PDCCH correspondence illustrated in FIG. 18 corresponds to the third approach for resource allocation described in connection with FIG. 12 above.

In this example, an eNB may indicate that a PDCCH corresponds to a D2D link (or to a normal link) based on a RNTI. For example, if a PDCCH corresponds to a normal link, the eNB may generate and send a PDCCH with a particular scrambling sequence (e.g., C-RNTI). However, if a PDCCH corresponds to a D2D link, the eNB may generate and send a PDCCH with a different scrambling sequence (e.g., RNTI). Accordingly, each UE may monitor a PDCCH for a particular scrambling sequence to determine whether a PDCCH corresponds to a normal link or to a D2D link.

In the example illustrated in FIG. 18, each UE 1818*a-c* monitors a PDCCH with C-RNTI specific to each corresponding UE 1818*a-c*, respectively. UE A 1818*a* also monitors RNTI D 1880. For instance, UE A 1818*a* (e.g., a transmitting UE) monitors C-RNTI A 1858 (that is specific to UE A 1818*a*) and UE A 1818*a* monitors RNTI D 1880 (that is specific to the transmitting UEs of a particular D2D link). Additionally, UE B 1818*b* and UE C 1818*c* (e.g., receiving UEs) monitor RNTI E 1882 (that is specific to receiving UEs of a particular D2D link). An eNB may utilize dedicated RRC signaling to inform each UE 1818*a-c* of RNTI D 1880 and/or RNTI E 1882.

In the example illustrated in FIG. 18, each of UE A 1818*a*, UE B 1818*b* and UE C 1818*c* monitors a PDCCH with C-RNTI (specific to each UE 1818*a-c*, respectively). UE A 1818*a* also monitors a PDCCH with RNTI D 1880 (specific to a transmitting UE (e.g., UE A 1818*a*)). In this example, UE A 1818*a* receives a PDCCH from an eNB with C-RNTI A 1858, which provides a normal link indication 1866. UE A 1818*a* may determine that this PDCCH corresponds to a normal link based on C-RNTI A 1858. UE A 1818*a* also receives a PDCCH with RNTI D 1880, which provides a D2D link indication 1868*a*. UE A 1818*a* may determine that this PDCCH corresponds to a D2D link based on RNTI D 1880.

Additionally, UE B 1818*b* (e.g., a receiving UE) receives a PDCCH from an eNB with RNTI E 1882, which provides a D2D link indication 1868*b*. UE B 1818*b* may determine that this PDCCH corresponds to a D2D link based on RNTI E 1882. Furthermore, UE C 1818*c* (e.g., a receiving UE) receives a PDCCH from an eNB with RNTI E 1882, which provides a D2D link indication 1868*c*. UE C 1818*c* may determine that this PDCCH corresponds to a D2D link based on RNTI E 1882.

Figure 19:
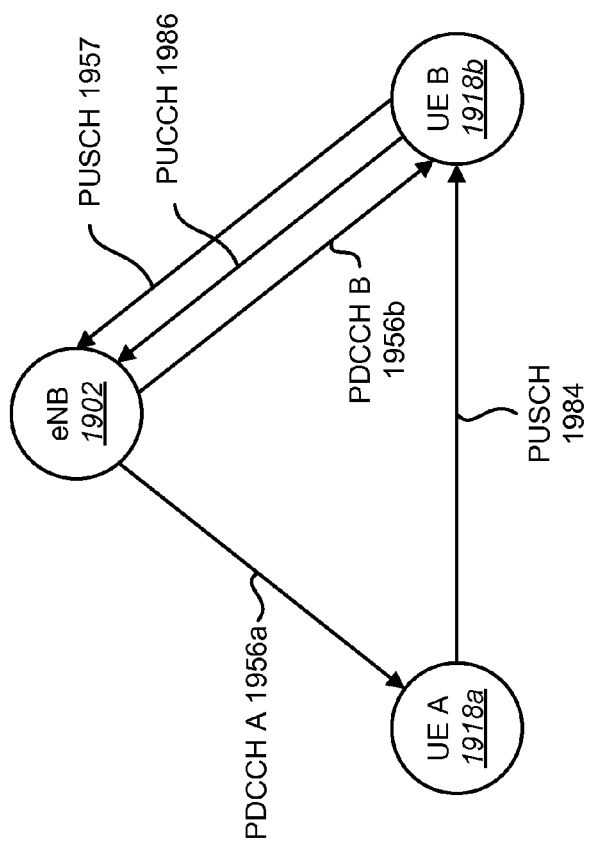
FIG. 19 is a diagram illustrating examples of some configurations of a D2D communication procedure in accordance with the systems and methods disclosed herein.
Figure 20:
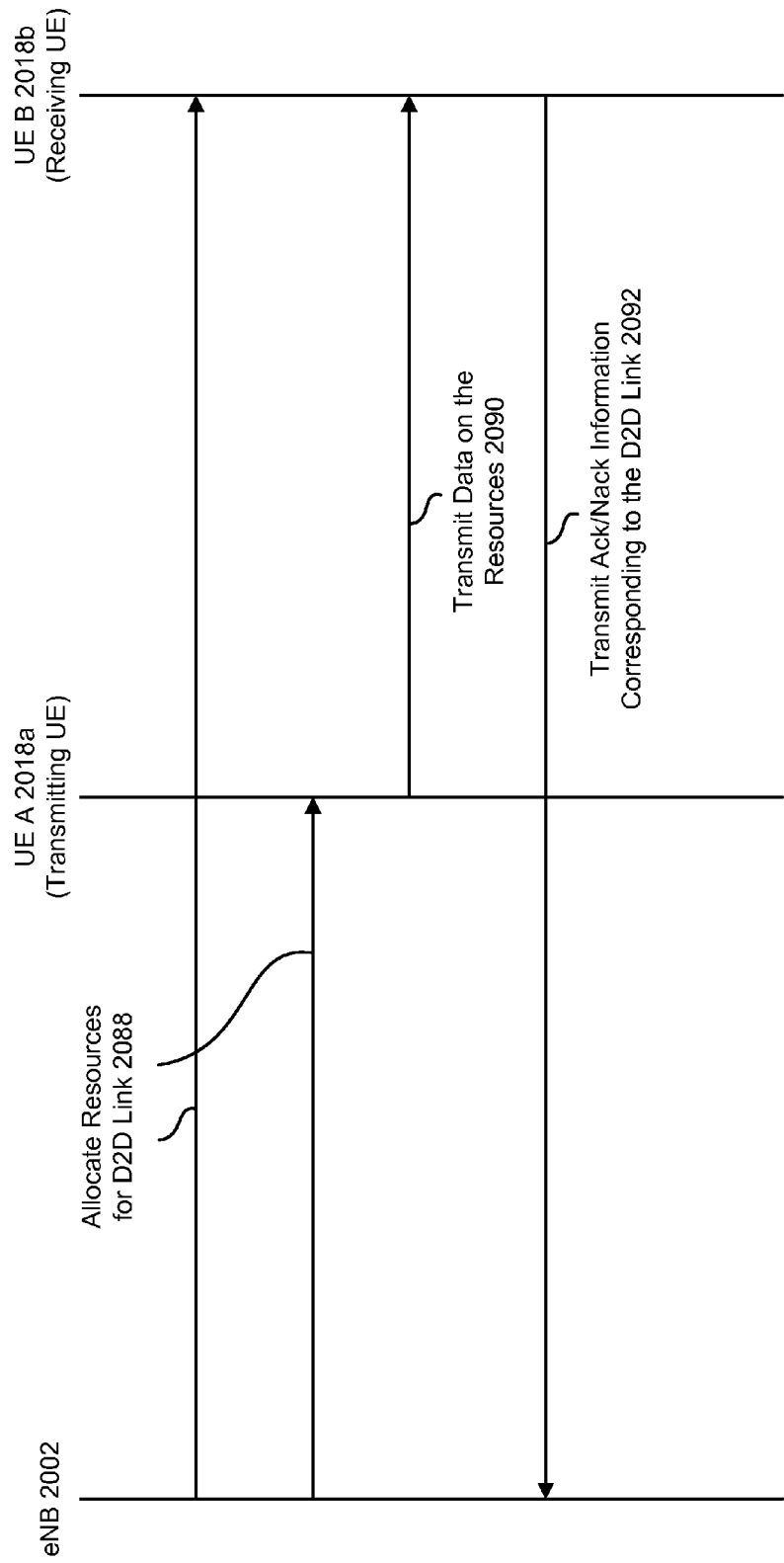
FIG. 20 is a diagram illustrating an example of a procedure for transmission of one packet (transport block) over a D2D link.

FIG. 19 is a diagram illustrating examples of some configurations of a D2D communication procedure in accordance with the systems and methods disclosed herein. In particular, FIGS. 19-20 provide more detail regarding some configurations of a D2D communication procedure. In a case of dynamic resource allocation, a D2D communication procedure may occur in accordance with the following steps.

An eNB 1902 may schedule and allocate resources for D2D communication in accordance with one or more of the approaches described above using one or more PDCCHs 1956*a-b*. The scheduling procedure allocates resources and identifies the transmitting UE(s) (e.g., UE A 1918*a*) and the receiving UE(s) (e.g., UE B 1918*b*). For example, assume that UE A 1918*a* is a transmitting UE and that UE B 1918*b* is a receiving UE.

A transmitting UE (e.g., UE A 1918*a*) may transmit data (and optionally some control information) to a receiving UE (e.g., UE B 1918*b*) by utilizing the allocated resources. For example, UE A 1918*a* transmits data (and possibly some control information) to UE B 1918*b* using the allocated resources on a PUSCH 1984.

The receiving UE receives the data (and optionally some control information) on the PUSCH 1984. For example, UE B 1918*b* receives the transmission from UE A 1918*a* on the PUSCH 1984. If the packet is successfully received, an acknowledgement (Ack) is generated by the receiving UE (e.g., UE B 1918*b*). If the packet is unsuccessfully received, if the packet is lost or if the packet is not received due to link failure or the receiving UE (e.g., UE B 1918*b*) was not able to decode the packet, a negative acknowledgment (Nack) may be generated by the receiving UE (e.g., UE B 1918*b*). The generated Ack/Nack at UE B 1918*b* may be transmitted to the eNB 1902 on a PUCCH 1986 or a PUSCH 1957. In some configurations, the PUSCH 1984 between UE A 1918*a* and UE B 1918*b* may be different from the PUSCH 1957 between UE B 1918*b* and the eNB 1902.

The eNB (e.g., eNB 1902) receives the Ack/Nack. In the case of an Ack, the eNB (e.g., eNB 1902) may schedule transmission of a new data packet. The procedure may then restart. For example, the eNB 1902 may schedule and allocate resources for a D2D communication as described above (for the new data packet, for instance). In the case of a Nack, the eNB (e.g., eNB 1902) may schedule a retransmission. The procedure may then restart. For example, the eNB 1902 may schedule and allocate resources for a D2D communication as described above (for the retransmission, for instance). Thus, FIG. 19 illustrates a procedure for transmission of D2D data traffic as well as required control signaling.

FIG. 20 is a diagram illustrating an example of a procedure for transmission of one packet (transport block) over a D2D link. This procedure includes allocating 2088 resources by an eNB 2002, transmission or retransmission 2090 by a transmitting UE (e.g., a D2D transmitter), and Ack/Nack transmission 2092 by receiving UE (e.g., a D2D receiver) to the eNB 2002.

For example, an eNB 2002 allocates 2088 resources for a D2D link. For instance, the eNB 2002 may transmit one or more PDCCHs to UE A 2018*a* (a transmitting UE) and to UE B 2018*b* (a receiving UE) as described above. UE A 2018*a* may then transmit 2090 data on the allocated resources (e.g., on the D2D link). UE B 2018*b* may transmit 2092 Ack/Nack information corresponding to the D2D link to the eNB 2002.

Figure 21:
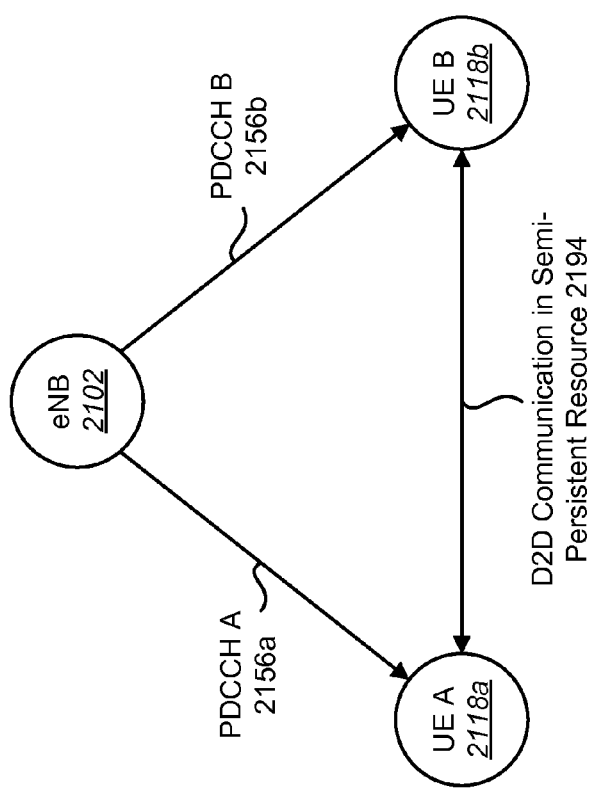
FIG. 21 is a diagram illustrating an example of a transmission procedure with semi-persistent scheduling.

FIG. 21 is a diagram illustrating an example of a transmission procedure with semi-persistent scheduling. In a case of semi-persistent resource allocation, a D2D communication procedure may occur as follows.

An eNB 2102 may schedule and allocate semi-persistent resources for D2D communication as described in one or more of the approaches above using one or more PDCCHs 2156*a-b*. For example, assume that UE A 2118*a* is a transmitting UE and that UE B 2118*b* is a receiving UE.

A transmitting UE (e.g., UE A 2118*a*) and a receiving UE (e.g., UE B 2118*b*) may begin to communicate with each other using a PUSCH and/or PUCCH until a semi-persistent resource is released. For example, UE A 2118*a* and UE B 2118*b* may perform D2D communication in a semi-persistent resource 2194. For instance, UE A 2118*a* and UE B 2118*b* start to communicate with each other using the PUSCH and/or the PUCCH until the semi-persistent resource is released (as indicated by the eNB 2102, for example).

Figure 22:
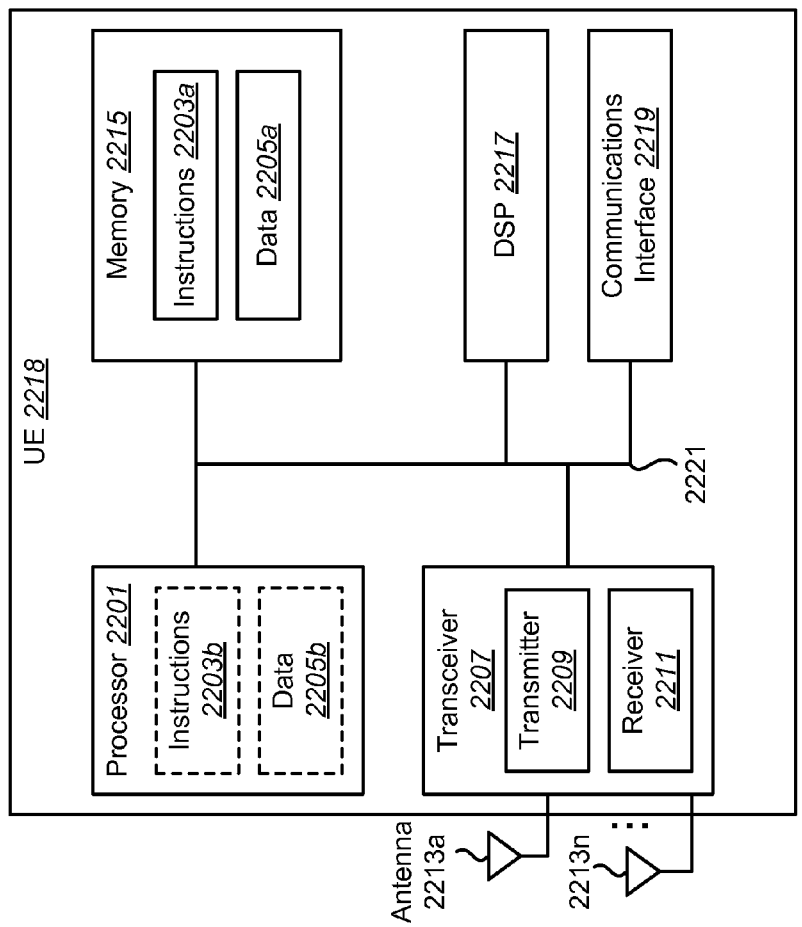
FIG. 22 illustrates various components that may be utilized in a UE.

FIG. 22 illustrates various components that may be utilized in a UE 2218. One or more of the UEs 118, 518, 618, 718, 1018, 1118, 1218, 1318, 1418, 1518, 1618, 1718, 1818, 1918, 2018, 2118 described herein may be implemented in accordance with the UE 2218 described in connection with FIG. 22. The UE 2218 includes a processor 2201 that controls operation of the UE 2218. The processor 2201 may also be referred to as a central processing unit (CPU). Memory 2215, which may include read-only memory (ROM), random access memory (RAM), a combination of the two or any type of device that may store information, provides instructions 2203*a* and data 2205*a* to the processor 2201. A portion of the memory 2215 may also include non-volatile random access memory (NVRAM). Instructions 2203*b* and data 2205*b* may also reside in the processor 2201. Instructions 2203*b* and/or data 2205*b* loaded into the processor 2201 may also include instructions 2203*a* and/or data 2205*a* from memory 2215 that are loaded for execution or processing by the processor 2201. The instructions 2203*b* may be executed by the processor 2201 to implement the one or more of the methods 400 and approaches described above.

The UE 2218 may also include a housing that contains one or more transmitters 2209 and one or more receivers 2211 to allow transmission and reception of data. The transmitter(s) 2209 and receiver(s) 2211 may be combined into one or more transceivers 2207. One or more antennas 2213*a-n* are attached to the housing and electrically coupled to the transceiver 2207.

The various components of the UE 2218 are coupled together by a bus system 2221, which may include a power bus, a control signal bus and a status signal bus, in addition to a data bus. However, for the sake of clarity, the various buses are illustrated in FIG. 22 as the bus system 2221. The UE 2218 may also include a digital signal processor (DSP) 2217 for use in processing signals. The UE 2218 may also include a communications interface 2219 that provides user access to the functions of the UE 2218. The UE 2218 illustrated in FIG. 22 is a functional block diagram rather than a listing of specific components.

Figure 23:
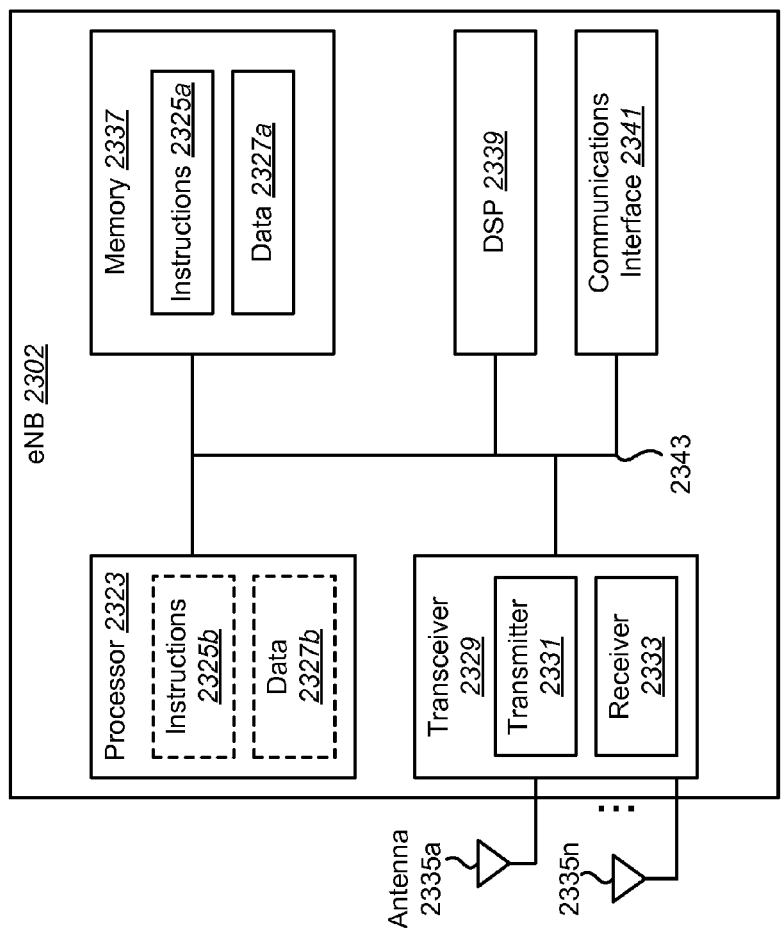
FIG. 23 illustrates various components that may be utilized in an eNB.

FIG. 23 illustrates various components that may be utilized in an eNB 2302. One or more of the eNBs 102, 502, 602, 702, 1902, 2002, 2102 described herein may be implemented in accordance with the eNB 2302 described in connection with FIG. 23. The eNB 2302 includes a processor 2323 that controls operation of the eNB 2302. The processor 2323 may also be referred to as a central processing unit (CPU). Memory 2337, which may include read-only memory (ROM), random access memory (RAM), a combination of the two or any type of device that may store information, provides instructions 2325*a* and data 2327*a* to the processor 2323. A portion of the memory 2337 may also include non-volatile random access memory (NVRAM). Instructions 2325*b* and data 2327*b* may also reside in the processor 2323. Instructions 2325*b* and/or data 2327*b* loaded into the processor 2323 may also include instructions 2325*a* and/or data 2327*a* from memory 2337 that are loaded for execution or processing by the processor 2323. The instructions 2325*b* may be executed by the processor 2323 to implement one or more of the methods 200, 300 and approaches described above.

The eNB 2302 may also include a housing that contains one or more transmitters 2331 and one or more receivers 2333 to allow transmission and reception of data. The transmitter(s) 2331 and receiver(s) 2333 may be combined into one or more transceivers 2329. One or more antennas 2335*a-n* are attached to the housing and electrically coupled to the transceiver 2329.

The various components of the eNB 2302 are coupled together by a bus system 2343, which may include a power bus, a control signal bus and a status signal bus, in addition to a data bus. However, for the sake of clarity, the various buses are illustrated in FIG. 23 as the bus system 2343. The eNB 2302 may also include a digital signal processor (DSP) 2339 for use in processing signals. The eNB 2302 may also include a communications interface 2341 that provides user access to the functions of the eNB 2302. The eNB 2302 illustrated in FIG. 23 is a functional block diagram rather than a listing of specific components.

Figure 24:
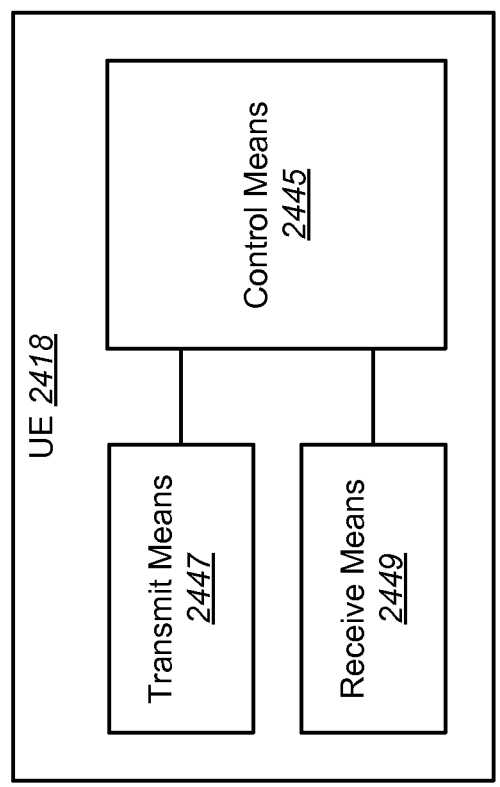
FIG. 24 is a block diagram illustrating one configuration of a UE in which systems and methods for determining resources for a D2D link may be implemented.

FIG. 24 is a block diagram illustrating one configuration of a UE 2418 in which systems and methods for determining resources for a D2D link may be implemented. The UE 2418 includes transmit means 2447, receive means 2449 and control means 2445. The transmit means 2447, receive means 2449 and control means 2445 may be configured to perform one or more of the functions described in connection with FIG. 4 and FIG. 22 above. FIG. 22 above illustrates one example of a concrete apparatus structure of FIG. 24. Other various structures may be implemented to realize one or more of the functions of FIG. 4 and FIG. 22. For example, a DSP may be realized by software.

Figure 25:
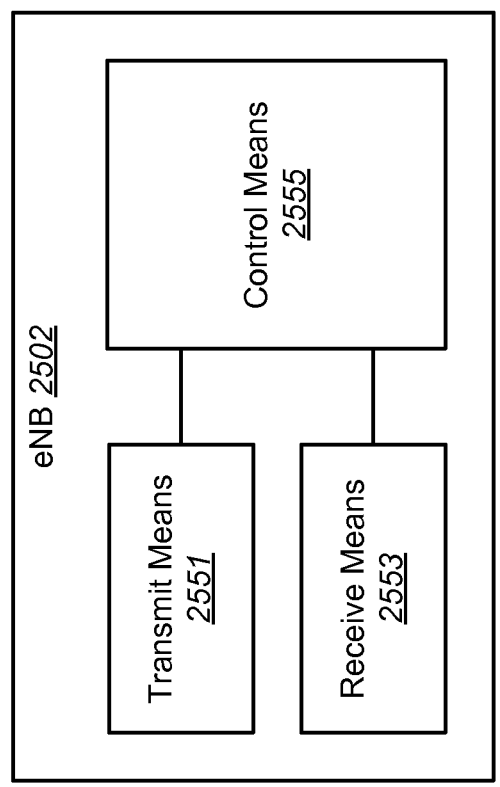
FIG. 25 is a block diagram illustrating one configuration of an eNB in which systems and methods for allocating resources for a D2D link may be implemented.

FIG. 25 is a block diagram illustrating one configuration of an eNB 2502 in which systems and methods for allocating resources for a D2D link may be implemented. The eNB 2502 includes transmit means 2551, receive means 2553 and control means 2555. The transmit means 2551, receive means 2553 and control means 2555 may be configured to perform one or more of the functions described in connection with FIGS. 2-3 and 23 above. FIG. 23 above illustrates one example of a concrete apparatus structure of FIG. 25. Other various structures may be implemented to realize one or more of the functions of FIGS. 2-3 and 23. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An evolved Node B (eNB) for allocating resources for a device-to-device (D2D) transmission or reception between User Equipments (UEs), comprising:
   a processor;
   memory in electronic communication with the processor;
   instructions stored in the memory, the instructions being executable to:
      allocate resources for a D2D signal by Downlink Control Information (DCI) on a Physical Downlink Control Channel (PDCCH), wherein Cyclic Redundancy Check (CRC) of the DCI is scrambled by a different sequence for a D2D link than a Cell Radio Network Temporary Identifier (C-RNTI) for a normal link and the D2D signal is transmitted or received by the UE and the resources for the D2D signal are allocated by the DCI for a certain period of time wherein the period is semi-statically configured.

2. The eNB of claim 1, wherein the D2D signal is transmitted or received on a Physical Uplink Shared Channel (PUSCH).

3. The eNB of claim 1, wherein the UE transmits the D2D signal to or receives the D2D signal from another UE that communicates with the eNB.

4. The eNB of claim 1, wherein the UE transmits the D2D signal to or receives the D2D signal from another UE that communicates with another eNB.

5. A User Equipment (UE) for determining resources for a device-to-device (D2D) transmission, comprising:
   a processor;
   memory in electronic communication with the processor;
   instructions stored in the memory, the instructions being executable to:
      receive resource allocation for a D2D signal by Downlink Control Information (DCI) on a Physical Downlink Control Channel (PDCCH), wherein Cyclic Redundancy Check (CRC) of the DCI is scrambled by a different sequence for a D2D link than a Cell Radio Network Temporary Identifier (C-RNTI) for a normal link and the resources for the D2D signal are allocated by the DCI for a certain period of time wherein the period is semi-statically configured.

6. The UE of claim 5, wherein the D2D signal is transmitted on a Physical Uplink Shared Channel (PUSCH).

7. The UE of claim 5, wherein the instructions are further executable to communicate with an evolved Node B (eNB).

8. The UE of claim 7, wherein the UE transmits the D2D signal to UE that communicates with the same eNB.

9. The UE of claim 7, wherein the UE transmits the D2D signal to another UE that communicates with another eNB.

10. A method for allocating resources for a device-to-device (D2D) transmission or reception between User Equipments (UEs) by an evolved Node B (eNB), comprising:
    allocating resources for a D2D signal by Downlink Control Information (DCI) on a Physical Downlink Control Channel (PDCCH), wherein Cyclic Redundancy Check (CRC) of the DCI is scrambled by a different sequence for a D2D link than a Cell Radio Network Temporary Identifier (C-RNTI) for a normal link and the resources for the D2D signal are allocated by the DCI for a certain period of time wherein the period is semi-statically configured.

11. The method of claim 10, wherein the D2D signal is transmitted or received on a Physical Uplink Shared Channel (PUSCH).

12. The method of claim 10, wherein the UE transmits the D2D signal to or receives the D2D signal from another UE that communicates with the eNB.

13. The method of claim 10, wherein the UE transmits the D2D signal to or receives the D2D signal from another UE that communicates with another eNB.

14. A method for determining resources for a device-to-device (D2D) transmission by a User Equipment (UE), comprising:
    receiving resource allocation for a D2D signal by Downlink Control Information (DCI) on a Physical Downlink Control Channel (PDCCH), wherein Cyclic Redundancy Check (CRC) of the DCI is scrambled by a different sequence for a D2D link than a Cell Radio Network Temporary Identifier (C-RNTI) for a normal link and the resources for the D2D signal are allocated by the DCI for a certain period of time wherein the period is semi-statically configured.

15. The method of claim 14, wherein the D2D signal is transmitted on a Physical Uplink Shared Channel (PUSCH).

16. The method of claim 14, further comprising communicating with an evolved Node B (eNB).

17. The method of claim 16, wherein the UE transmits the D2D signal to another UE that communicates with the same eNB.

18. The method of claim 16, wherein the UE transmits the D2D signal to another UE that communicates with another eNB.

* * * * *